United States Patent [19]
Takeuchi

[11] Patent Number: 6,141,061
[45] Date of Patent: Oct. 31, 2000

[54] IMAGE REDUCTION AND ENLARGEMENT PROCESSING

[75] Inventor: Kesatoshi Takeuchi, Suwa, Japan

[73] Assignee: Seiko Epson Corporation, Tokyo, Japan

[21] Appl. No.: 08/969,944

[22] Filed: Nov. 25, 1997

[30] Foreign Application Priority Data

May 9, 1997 [JP] Japan ................................. 9-135863

[51] Int. Cl.[7] .................................................. H04N 9/74
[52] U.S. Cl. ..................... 348/581; 348/441; 345/127; 382/300
[58] Field of Search ..................................... 348/441, 568, 348/704, 556, 561, 445, 458, 581, 342; 345/127, 129, 130, 131, 439; 382/298, 299, 300; H04N 9/74

[56] References Cited

U.S. PATENT DOCUMENTS

| | | | |
|---|---|---|---|
| 5,283,651 | 2/1994 | Ishizuka | 348/704 |
| 5,343,238 | 8/1994 | Takata et al. | 348/556 |
| 5,353,067 | 10/1994 | Kaji | 348/568 |

FOREIGN PATENT DOCUMENTS

| | | |
|---|---|---|
| 62-176369 | 8/1987 | Japan . |
| 2-26479 | 1/1990 | Japan . |
| 2-174480 | 7/1990 | Japan . |
| 2-222992 | 9/1990 | Japan . |
| 5-313646 | 11/1993 | Japan . |
| 5-316539 | 11/1993 | Japan . |
| 6-153142 | 5/1994 | Japan . |
| 6-225209 | 8/1994 | Japan . |
| 7-38805 | 2/1995 | Japan . |
| 7-59027 | 3/1995 | Japan . |
| 7-143452 | 6/1995 | Japan . |

*Primary Examiner*—Michael H. Lee
*Attorney, Agent, or Firm*—Oblon, Spivak, McClelland, Maier & Neustadt, P.C.

[57] ABSTRACT

When image reduction is effected at the writing of the image to a frame memory, a first image portion which is to be dropped by the reduction is subjected to weighted-averaging with a second image portion adjacent thereto to modify the second image portion. When an image read from the frame memory is enlarged, a first image portion which is to be added by the enlargement is generated by weighted-averaging two second image portions located before and after the first image portion. When an image is enlarged, it is enlarged by a first enlargement factor in the range of 1 to 2 and enlarged by a second enlargement factor that is an integer, thereby obtaining a result image enlarged by a third enlargement factor that is the product of the first and second enlargement factors.

24 Claims, 17 Drawing Sheets

REDUCTION/FILTERING AT IMAGE WRITE
Fig. 4(A) ORIGINAL IMAGE
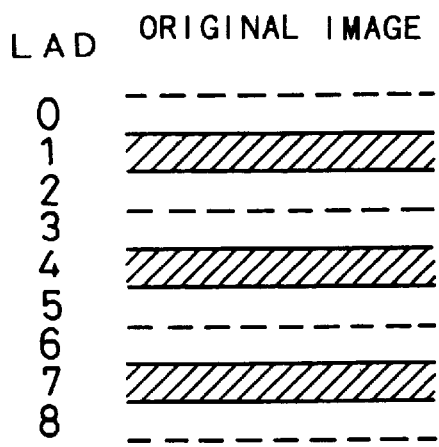
Fig. 4(B) PRIOR ART REDUCED IMAGE
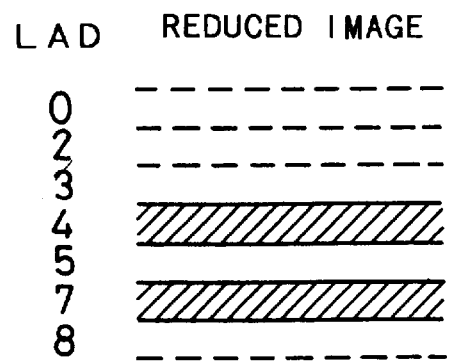
Fig. 4(C) INVENTION REDUCED IMAGE
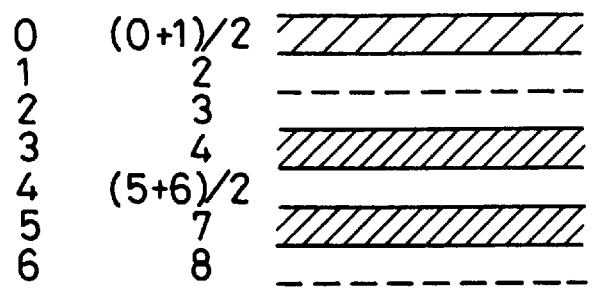

Fig. 6

CALCULATION OF VERTICAL DECIMATION PARAMETERS

| Rwv | LAD | WLAD=<br>Rwv*LAD | Fwv | MPX | Voutl |
|---|---|---|---|---|---|
| 0.8 | 0 | 0 | L | A | L0 ← OVERWRITE |
|  | 1 | 0 → | H | B | $\frac{1}{2}$(L0+L1) |
|  | 2 | 1 | L | A | L2 |
|  | 3 | 2 | L | A | L3 |
|  | 4 | 3 | L | A | L4 |
|  | 5 | 4 | L | A | L5 ← OVERWRITE |
|  | 6 | 4 → | H | B | $\frac{1}{2}$(L5+L6) |
|  | 7 | 5 | L | A | L7 |
|  | 8 | 6 | L | A | L8 |

DECIMATION PROCESSING OPERATION AT IMAGE WRITE
Fig. 7(a) LAD 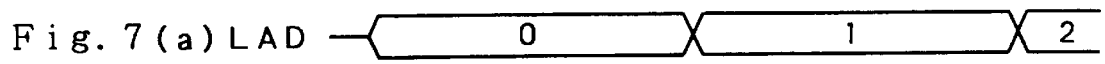
Fig. 7(b) WLAD 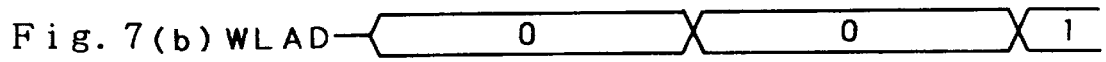
Fig. 7(c) Fwv 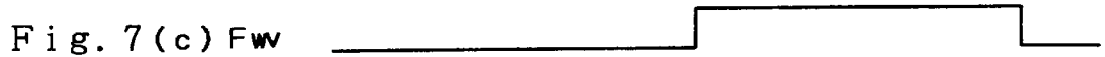
Fig. 7(d) FW# 
Fig. 7(e) FR# 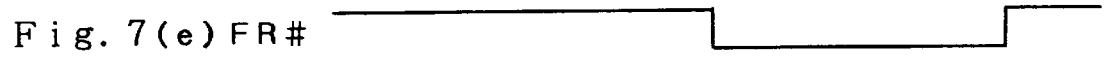
Fig. 7(f) Va 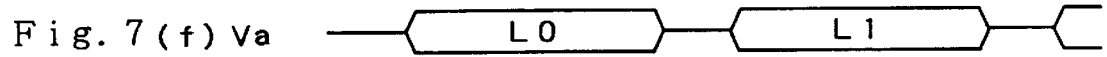
Fig. 7(g) Vb 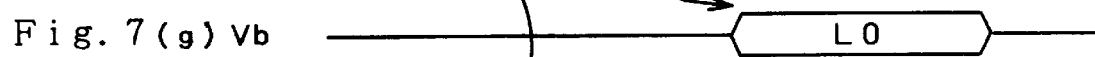
Fig. 7(h) Vab 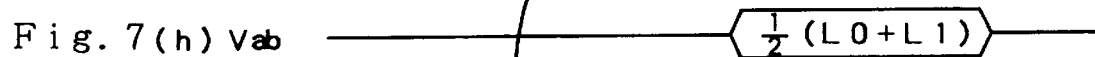
Fig. 7(i) Vout1 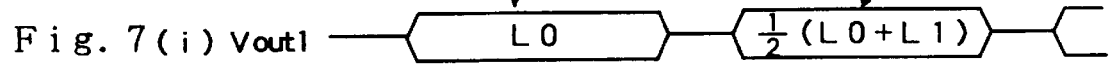

Fig. 8(A)
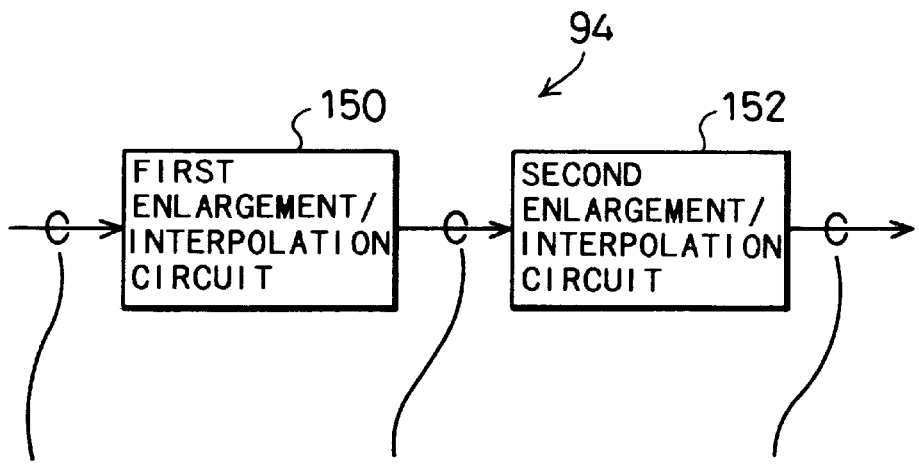
Fig. 8(B) V1   Fig. 8(C) V2   Fig. 8(D) V3
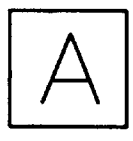
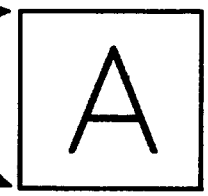
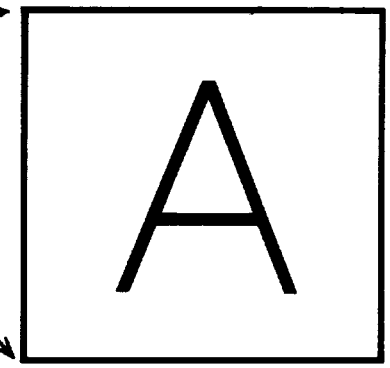
M1 TIMES
$1 \leq M1 \leq 2$
M2 TIMES
(M2 = INTEGER)
$$\frac{V3}{V1} = M1 \times M2$$

PROCESSING BY FIRST ENLARGEMENT/INTERPOLATION
CIRCUIT 150

Fig. 9(A)

ORIGINAL IMAGE

Fig. 9(B) PRIOR ART

ENLARGED IMAGE

Fig. 9(C) INVENTION

Fig. 11  CALCULATION OF INTERPOLATION FLAG AT IMAGE READ

| Rrv | LAD | LAD/Rrv | RLAD | LFIFO | Frv | MPX | Uout1 |
|---|---|---|---|---|---|---|---|
| 1.25 | 0 | 0 | 0 | — | L | A | L0 |
| | 1 | 0 | 1 | L0 | H | B | $\frac{1}{2}(L0+L1)$ |
| | 2 | 1 | 1 | L0 | L | A | L1 |
| | 3 | 2 | 2 | L1 | L | A | L2 |
| | 4 | 3 | 3 | L2 | L | A | L3 |
| | 5 | 4 | 4 | L3 | L | A | L4 |
| | 6 | 4 | 5 | L4 | H | B | $\frac{1}{2}(L4+L5)$ |
| | 7 | 5 | 5 | L4 | L | A | L5 |
| | 8 | 6 | 6 | L5 | L | A | L6 |

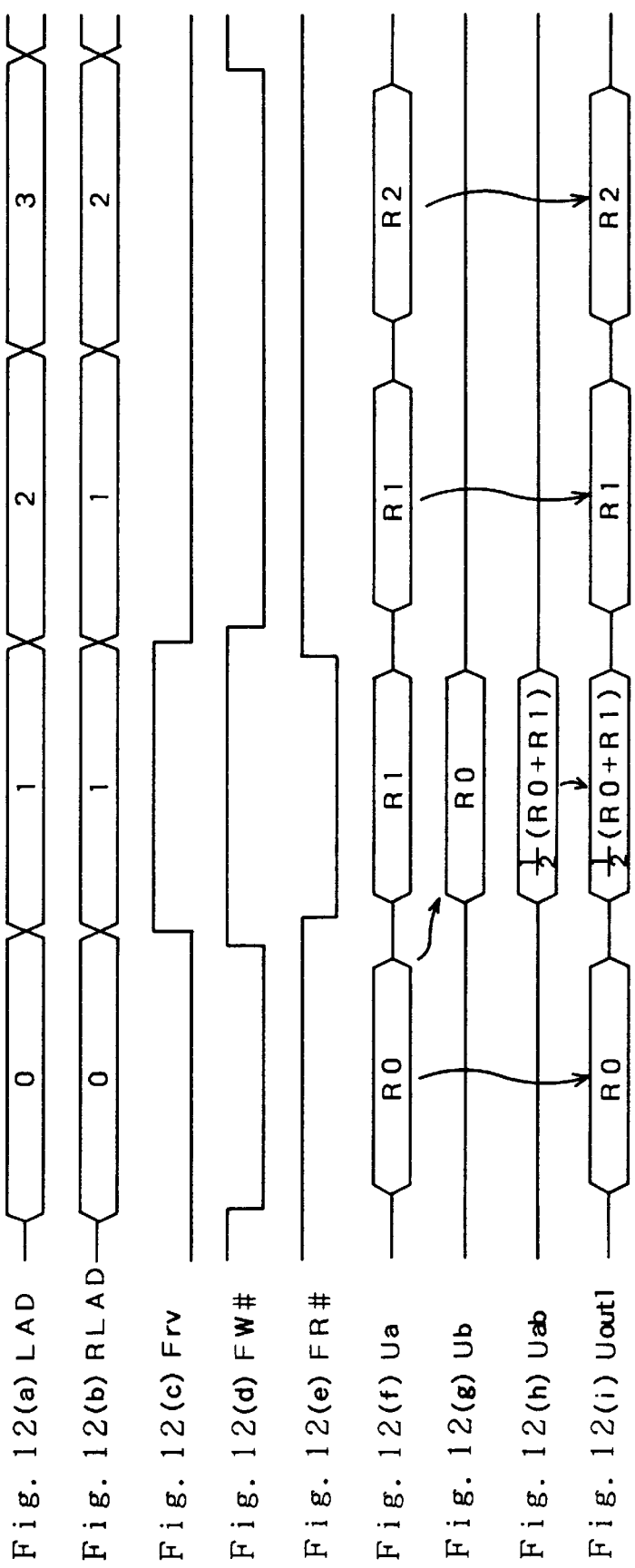

OPERATION OF SECOND ENLARGEMENT/INTERPOLATION CIRCUIT

Fig. 13(A) ORIGINAL IMAGE

Fig. 13(B) ENLARGED IMAGE

L0
L1
L2
L3
L4
L5

L0
$\frac{1}{2}(L0+L1)$
L1
$\frac{1}{2}(L1+L2)$
L2
$\frac{1}{2}(L2+L3)$
L3
$\frac{1}{2}(L3+L4)$
L4
$\frac{1}{2}(L4+L5)$
L5

VIDEO SIGNAL LNv OF ADDED LINE
WHEN ENLARGED Nv TIMES $$L_{Nv} = (1-\alpha) \times L_{i-1} + \alpha \times L_i$$

$$\alpha v = \frac{j}{Nv} \quad (j=1 \sim Nv-1)$$

OR $$\alpha v = \frac{(NLAD) \%Nv}{Nv}$$

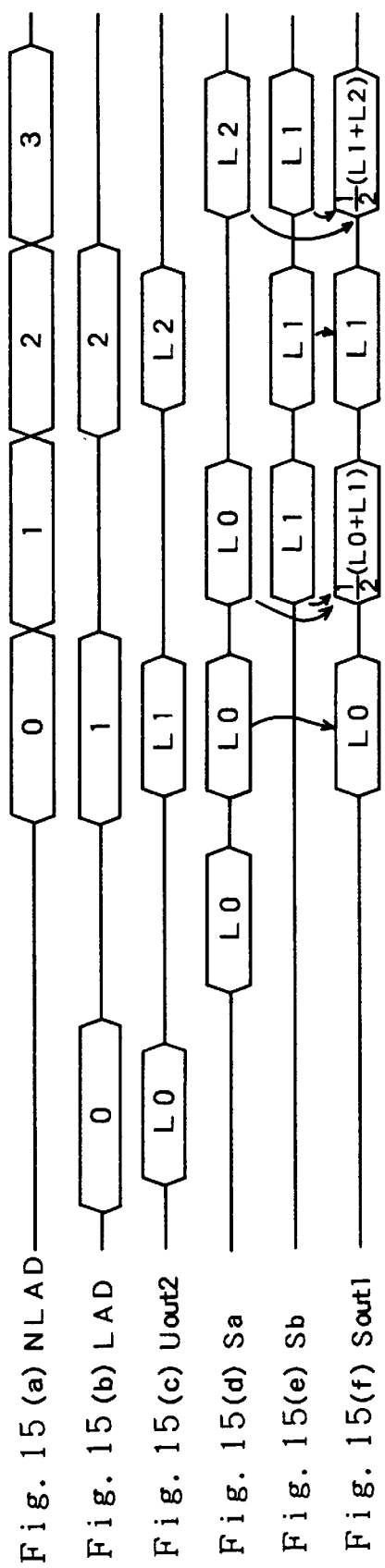

CONVENTIONAL REDUCTION PROCESSING
Fig. 16(A)               Fig. 16(B)
ORIGINAL IMAGE           REDUCED IMAGE
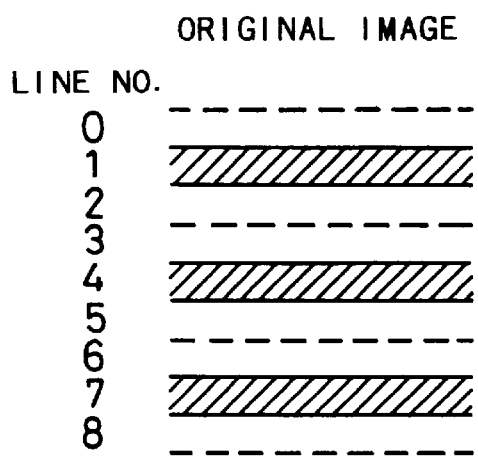
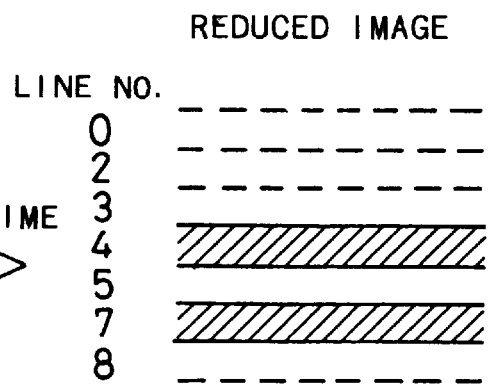
Fig. 16(C)    Fig. 16(D)
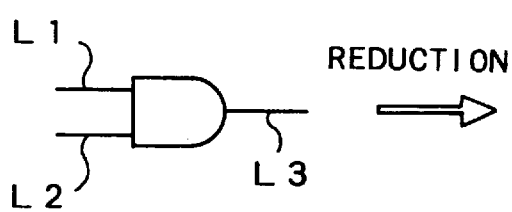
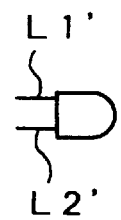

CONVENTIONAL ENLARGEMENT PROCESSING

ORIGINAL IMAGE

REDUCED IMAGE 1.25 TIMES

IMAGE REDUCTION AND ENLARGEMENT PROCESSING

BACKGROUND OF THE INVENTION

1. Field of the Invention

This invention relates to an image processing system having image scaling capabilities.

2. Discussion of the Background

Image processing systems may be required to effect image reduction processing and enlargement processing for scaling images to desired sizes. FIGS. 16(A)–16(D) are diagrams that explain the nature of conventional vertical image reduction processing. In the original image shown in FIG. 16(A), image lines numbered 1, 4 and 7 are black and the other lines are white. The reduced image shown in FIG. 16(B) is 0.8 times smaller than the original image.

In the reduced image shown in FIG. 16(B), the lines numbered 1 and 6 of the original image have been dropped and the reduced image is therefore missing one black horizontal line. As can be seen from this example, conventional vertical image reduction processing simply drops a number of lines. Fine line details are therefore sometimes lost. In the reduction of an original image having lines L1–L3 each having a width of one line as shown in FIG. 16(C), for example, the original line L3 may be dropped and completely lost after the image reduction as shown in FIG. 16(D). This problem of line dropping also arises during horizontal reduction.

FIGS. 17(A) and 17(B) are diagrams for explaining the nature of conventional vertical image enlargement processing. The original image shown in FIG. 17(A) is the same as that shown in FIG. 16(A) referred to above. The enlarged image shown in FIG. 17(B) is 1.25 times larger than the original image. The image of FIG. 17(B) includes two additional lines also numbered 0 and 4 of the original image. The width of these lines is therefore doubled. As can be seen from this example, conventional vertical image enlargement processing simply adds a number of lines. The thickness of some of the lines in the image therefore becomes excessively thick. This problem of line addition also arises during horizontal enlargement.

Moreover, the conventional enlargement processing can easily enlarge an image an integer number of times but has difficulty enlarging an image by an arbitrary scale factor including a fractional component.

SUMMARY OF THE INVENTION

Accordingly, an object of the present invention is to mitigate image line dropping during reduction and image line thickening during enlargement. Another object of the present invention is to enable an image to be enlarged by an arbitrary scale factor which may include a fractional component.

In order to attain at least part of the above and other objects of the present invention, there is provided an image processing apparatus comprising a frame memory for storing image data, a vertical reduction unit, and a horizontal reduction unit. The vertical reduction unit reduces an image represented by the image data in the vertical direction when the image data are written to the frame memory, detects a first line which is to be dropped by the reduction, and interpolates a plurality of lines of the image data including the first line and a second line adjacent to the first line to modify an image portion of the second line. The horizontal reduction unit reduces the image represented by the image data in the horizontal direction, detects a first pixel which is to be dropped by the reduction, and interpolates a plurality of pixels of the image data including the first pixel and a second pixel adjacent to the first pixel to modify an image portion of the second pixel.

The vertical reduction unit can detect a first line which is to be dropped by the reduction and prevent total loss of line information at the time of reduction. Since lines not adjacent to those lines which are to be dropped by reduction are not processed by interpolation, image quality degradation owing to the line dropping can be mitigated without appreciably degrading the sharpness of the image. Similarly in horizontal reduction, simple dropping of a pixel during reduction can be prevented and image quality degradation owing to pixel dropping can be mitigated without appreciably degrading the sharpness of the image.

In a preferred embodiment, each of the vertical reduction unit and the horizontal reduction unit comprises: a buffer memory for storing a prescribed amount of input image data; a weighted-averaging unit for obtaining a weighted-average of first image data read from the buffer memory and second image data representing an image portion immediately following the first image data to produce third image data; a selector for selecting and outputting one set from among a plurality of sets of image data including the input second image data and the third image data output by the weighted-averaging unit; and a selection signal generator for generating from an image reduction factor a selection signal indicating an image portion which is to be dropped by the reduction and supplying the selection signal to the selector.

In these reduction units, since one set from among plural sets of image data including the input second image data and the third image data generated by the weighted-averaging unit is selected and output, image data with mitigated dropout during reduction can be generated in real time.

The apparatus may further comprise a write address controller responsive to the selection signal for controlling incrementing of a write address input to the frame memory. By this, image date with mitigated dropout during reduction can be written to an appropriate address in the frame memory.

Preferably, the vertical reduction unit and the horizontal reduction unit each has a reduction factor in the range of 0.5 to 1, whereby the image portion which is to be dropped by the reduction in the vertical reduction unit is one line per location and the image portion which is to be dropped by the reduction in the horizontal reduction unit is one pixel per location.

According to another aspect of the present invention, an image processing apparatus comprises: a frame memory for storing image data; a vertical enlargement unit for enlarging an image represented by the image data read from the frame memory in the vertical direction, detecting a first line which is to be added by the enlargement, and interpolating a plurality of lines of the image data adjacent to the first line to generate image data for the first line, and a horizontal enlargement unit for enlarging an image represented by the image data in the horizontal direction, detecting a first pixel which is to be added by the enlargement, and interpolating a plurality of pixels of the image data adjacent to the first pixel to generate image data for the first pixel.

The vertical enlargement unit can, at the time a first line is added by the enlargement, generate the first line by interpolation of image data of plural lines including the first line and a second line adjacent to the first line. Thickening of a line due to simple addition of the same line during enlargement can therefore be prevented. Since the interpolation is not executed with respect to those lines which are present in the original image, image quality degradation owing to line thickening can be mitigated without appreciably degrading the sharpness of the image. Similarly in horizontal enlargement, simple pixel thickening during enlargement can be prevented and image quality degradation owing to simple pixel addition can be mitigated without appreciably degrading the sharpness of the image.

In a preferred embodiment, each of the vertical enlargement unit and the horizontal enlargement unit comprises: a buffer memory for storing a prescribed amount of input image data; a weighted-averaging unit for obtaining a weighted-average of first image data read from the buffer memory and second image data representing an image portion immediately following the first image data to produce third image data; a selector for selecting and outputting one set from among a plurality of sets of image data including the input second image data and the third image data output by the weighted-averaging unit; and a selection signal generator for generating from an image enlargement factor a selection signal indicating an image portion which is to be added by the enlargement and supplying the selection signal to the selector.

In these enlargement units, since one set from among plural sets of image data including the input second image data and the third image data generated by the weighted-averaging unit is selected and output, image data with mitigated thickening during enlargement can be generated in real time.

The apparatus may further comprise a read address controller responsive to the selection signal for controlling incrementing of a read address input to the frame memory. By this, image date with mitigated dropout during enlargement can be read from an appropriate address in the frame memory.

Preferably, the vertical enlargement unit and the horizontal enlargement unit each has an enlargement factor in the range of 1 to 2, whereby the image portion which is to be added by the enlargement in the vertical enlargement unit is one line per location and the image portion which is to be added by the enlargement in the horizontal enlargement unit is one pixel per location.

According to still another aspect of the present invention, an image processing apparatus for enlarging an image comprises: a first enlargement unit for enlarging an image in by a first enlargement factor in the range of 1 to 2; and a second enlargement unit for enlarging an image by a second enlargement factor that is an integer; wherein the first and second enlargement units execute the enlarging of the image in a prescribed order to enlarge the image by a third enlargement factor equal to the product of the first and second enlargement factors.

Since image enlargement at the first enlargement factor which can include a fractional component and image enlargement at the second enlargement factor that is an integer are effected serially, the image can be enlarged by a desired enlargement factor which can include a fractional component.

Preferably, the first and second enlargement units execute the enlarging in this order; and the enlargement processing is executed such that the second enlargement unit outputs image data at a second output rate which is equal to a product of a first output rate of the first enlargement unit and the second enlargement factor. Since this enables the second enlargement section to sequentially enlarge the image data output by the first enlargement section without modification, it enables the enlargement to be effected at a high overall processing speed.

The present invention is directed to an image processing method for executing the above image reduction and/or the image enlargement processing.

These and other objects, features, aspects, and advantages of the present invention will become more apparent from the following detailed description of the preferred embodiments with the accompanying drawings.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIGS. 4(A)–4(C) are explanatory diagrams outlining reduction/filtering processing during image write.

FIG. 6 is a diagram for explaining a method for calculating various parameters related to the operation of a vertical reduction/filter circuit 110.

FIGS. 7(a)–7(i) are timing charts showing the operation of the vertical reduction/filter circuit 110.

FIGS. 8(A)–8(D) are explanatory diagrams outlining the internal configuration and the nature of the processing effected by the enlargement/filter circuit 94 shown in FIG. 3.

FIGS. 9(A)–9(C) are explanatory diagrams outlining vertical enlargement/interpolation processing effected by a first enlargement/interpolation circuit 150.

FIG. 11 is a diagram for explaining a method for calculating various parameters related to the operation of a vertical enlargement/interpolation circuit 160 of the first enlargement/interpolation circuit 150.

FIGS. 12(a)–12(i) are timing charts showing the operation of the vertical enlargement/interpolation circuit 160 of the first enlargement/interpolation circuit 150.

FIGS. 13(A) and 13(B) are explanatory diagrams outlining the vertical enlargement/interpolation processing effected by a second enlargement/interpolation circuit 152.

FIGS. 15(a)–15(f) are timing charts showing the operation of a vertical enlargement/interpolation circuit 200 of the second enlargement/interpolation circuit 152.

FIGS. 16(A)–16(D) are diagrams for explaining the nature of conventional vertical image reduction processing.

DETAILED DESCRIPTION OF THE PREFERRED EMBODIMENTS

Figure 1:
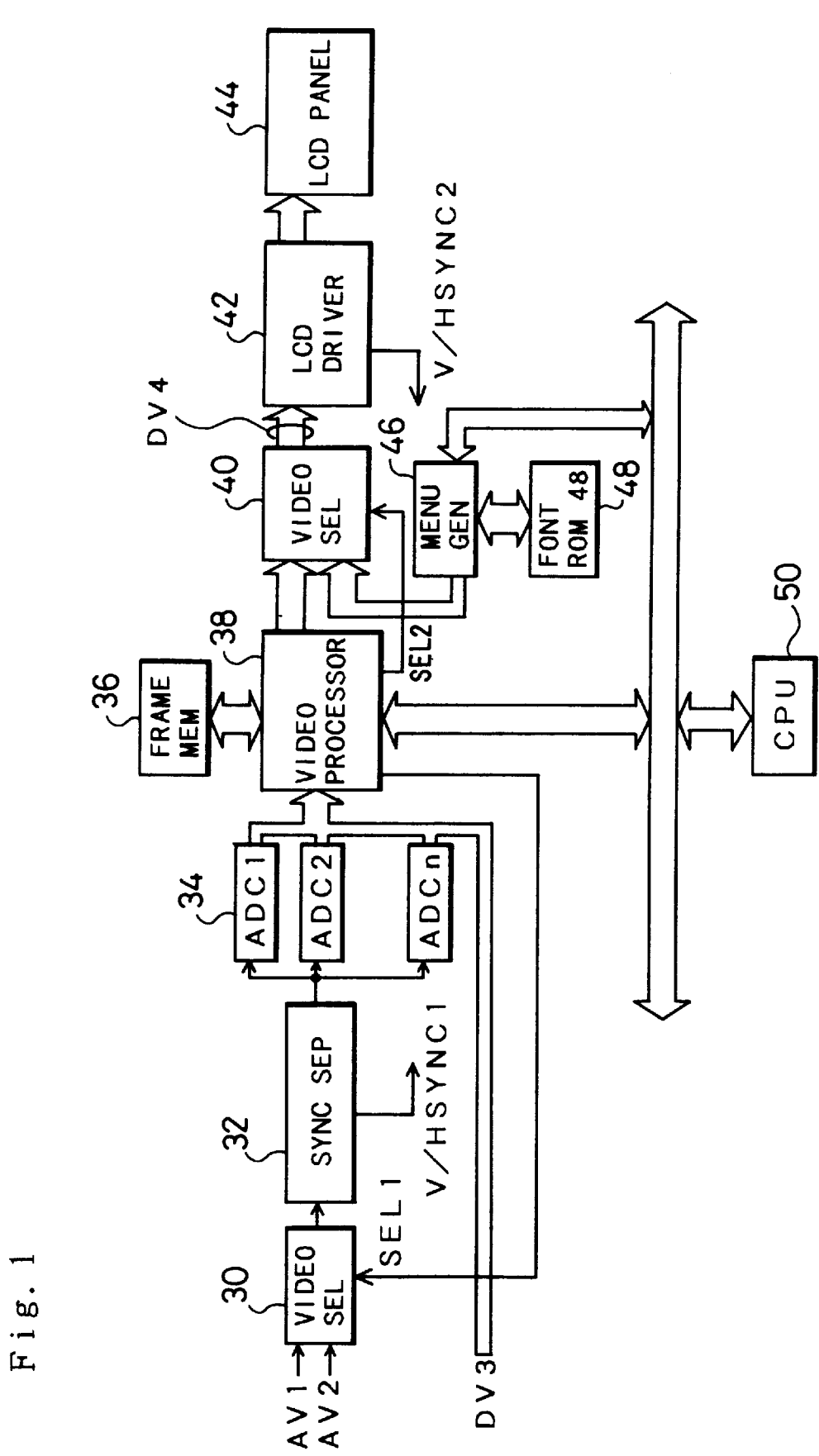
FIG. 1 is a block diagram showing the overall configuration of an image processing system which is an embodiment of the invention.

A. Overall configuration of the image processing system:

FIG. 1 is a block diagram showing the overall configuration of an image processing system which is an embodiment of the invention. The image processing system is a computer system comprising a first video selector 30, a sync separator 32, n pieces of A–D converters 34, a frame memory 36, a video processor 38, a second video selector 40, a liquid crystal display driver 42, a liquid crystal display panel 44, a menu generator 46, a font ROM 48 and a CPU 50.

The whole image processing system is installed inside a liquid crystal projector where it processes images for display on the liquid crystal display panel 44. The images displayed on the liquid crystal display panel 44 are projected onto a projection screen by an optical system (not shown). The first video selector 30 is input with multiple analog image signals V1, V2 and selectively outputs one of the input signals in response to a selection signal SEL1 received from the video processor 38. The multiple analog image signals V1, V2 can for instance be image signals from a personal computer representing a computer screen image or dynamic image signals from a video recorder, television or the like. The sync separator 32 separates a vertical sync signal VSYNC1 and a horizontal sync signal SYNC1 from the analog image signals received from the first video selector 30. It also outputs component image signals (image signals not including a sync signal).

The component image signals output by the sync separator 32 are converted to digital signals by the n pieces of A–D converters 34. Specifically, the n pieces of A–D converters 34 are sequentially switched one by one during use. Each A–D converter 34 converts the analog signal to a digital signal in accordance with sampling clock pulses of a frequency that is 1/n of the frequency of the original image signal.

The video processor 38 is a processor for effecting write and read of images to the frame memory 36 and has image enlargement and image reduction capabilities. The internal configuration and functions of the video processor 38 will be explained in detail later. In addition to being supplied with the digital image signals from the n pieces of A–D converters 34, the video processor 38 can also be supplied with a digital image signal DV3 output by another digital image output device.

The digital image signal read from the frame memory 36 and processed by the video processor 38 is input to the second video selector 40. The second video selector 40 is also supplied with another digital image signal output by the menu generator 46. The menu generator 46 generates a digital image signal representing a menu used by the operator to adjust display conditions of the liquid crystal display panel 44 (brightness, contrast, synchronization, tracking, color density and hue). The font ROM 48 stores font data for the characters used in the menu. The second video selector 40 is responsive to a selection signal SEL2 from the video processor 38 for switching between the two digital image signals input thereto to output the selected signal. As a result, a digital image video DV4 representing a composite image having the menu image superimposed on the image read from the frame memory 36 is output from the second video selector 40.

The digital image signal DV4 output by the second video selector 40 is supplied to the liquid crystal display driver 42. The liquid crystal display driver 42 is responsive to the digital image signal DV4 for displaying an image on the liquid crystal display panel 44. The liquid crystal display driver 42 also generates a vertical sync signal VSYNC2 and a horizontal sync signal HSYNC2 for image display and outputs them to the other circuits.

Reading of image signals from the frame memory 36 and processing of the read image signals is effected synchronously with the sync signals VSYNC2 and HSYNC2 output by the liquid crystal display driver 42. On the other hand, the sampling by the A–D converters 34 and the write of image signals to the frame memory 36 are effected synchronously with the sync signals VSYNC1 and HSYNC1 separated by the sync separator 32. The first sync signals VSYNC1, HSYNC1 and the second sync signals VSYNC2, HSYNC2 are mutually asynchronous. Alternatively, it is possible to use first sync signals VSYNC1, HSYNC1 and second sync signals VSYNC2, HSYNC2 that are mutually synchronous.

The processing up to write of the image signal received from an external source in the frame memory 36 is effected using the first sync signals VSYNC1 and HSYNC1. The processing between read of the image signal from the frame memory 36 and display of the image is effected using the second sync signals VSYNC2, HSYNC2, which may be synchronous or asynchronous with the first sync signals. A relatively wide range of frequencies can therefore be tolerated as the frequency of the input image signal irrespective of the frequency of the image signal for display. In other words, the input image signal can be written to the frame memory 36 in response to the frequency of the sync signals VSYC1, HSYNC1 of the input image signal while maintaining the frequency of the output image signal for display constant. The advantage of this is especially great when range of frequencies of the input image signal is very wide.

Figure 2:
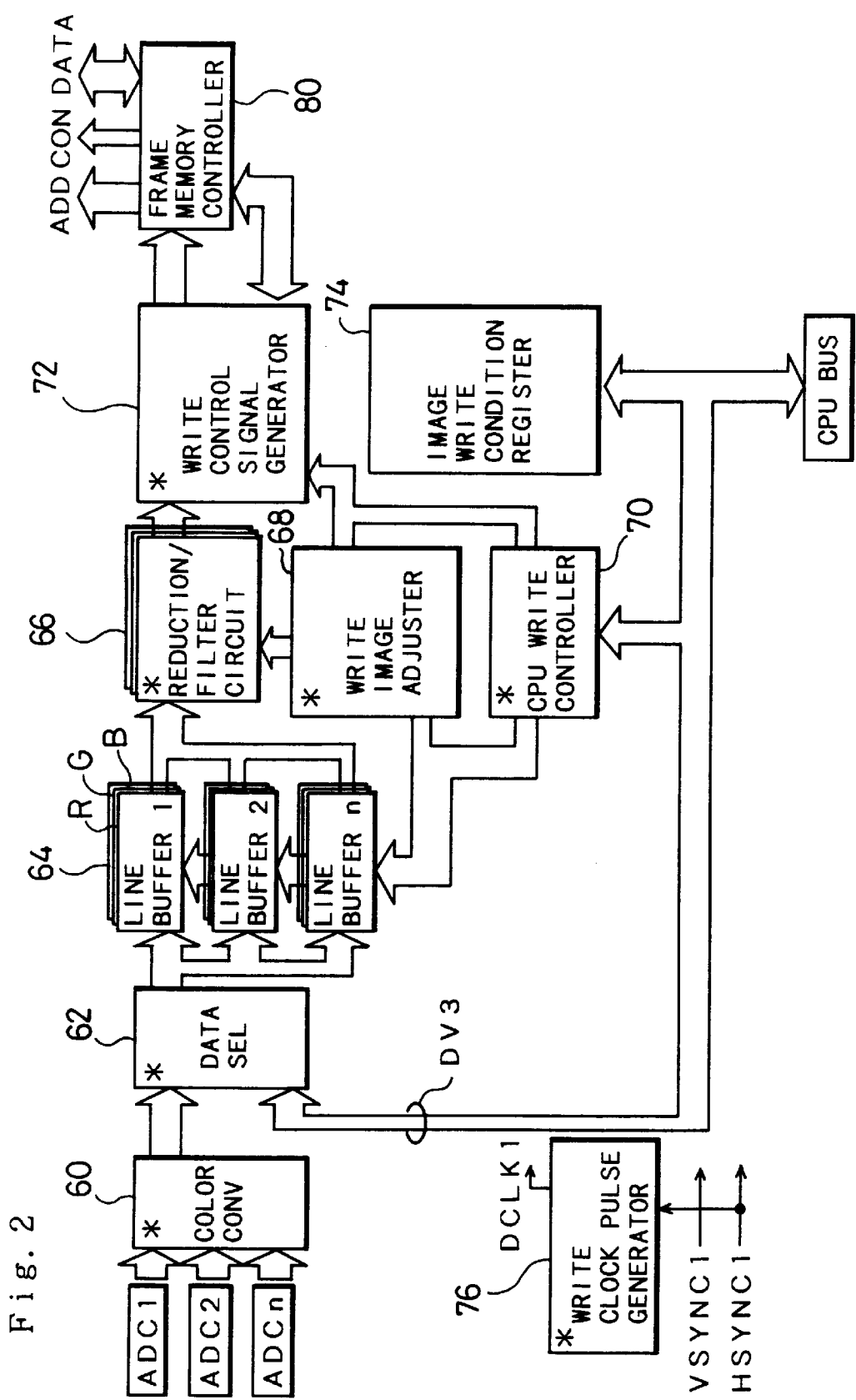
FIG. 2 is a block diagram showing the configuration of an image write control section in a video processor 38.

B. Internal configuration of the video processor 38:

FIG. 2 is a block diagram showing the configuration of an image write control section in the video processor 38. The image write control section comprises a color converter 60, a data selector 62, n pieces of line buffers 64, a reduction/filter circuit 66, a write image adjuster 68, a CPU write controller 70, a write control signal generator 72, an image write condition register 74, a write clock pulse generator 76 and a frame memory controller 80.

The n pieces of component image signals output by the n pieces of A–D converters 34 are input to the color converter 60. These component image signals can be any of various types including YUV signals and RGB signals. The color converter 60 can convert an input YUV signal to an RGB signal. When an RGB signal is input to the color converter 60, the color converter 60 outputs it unmodified.

The data selector 62 selects and outputs either the RGB signal output by the color converter 60 or the other RGB signal DV3 (FIG. 1) received through a bus. The selection signal for the data selector 62 is supplied by the CPU 50.

The line buffers 64 include the same number of buffer elements as the number of A–D converters 34. Since the color image is represented by an RGB three-color signal, n pieces of line buffers 64 are provided for each of R, G and B. The line buffers 64 are memories which temporarily store the n pieces of parallel image signals generated by the A–D converters 34.

The reduction/filter circuit 66 reduces the image which is to be written in the frame memory 36 in the vertical and horizontal directions and also effects filtering with respect to lines and pixels which are to be dropped due to the reduction. The internal configuration and operation of the reduction/filter circuit 66 will be explained later.

The write control signal generator 72 generates the address and control signals needed for writing the image signals to the frame memory 36 and supplies them to the frame memory controller 80. The frame memory controller 80 arbitrates writing and reading of image signals to and from the frame memory 36. Specifically, the frame memory controller 80 receives the write addresses and control signals from the write control signal generator 72 and the read addresses and control signals output by the read control signal generator of an image read control section described later and supplies these signals and addresses to the frame memory 36.

The write image adjuster 68 adjusts the vertical and horizontal size of the image which is to be written to the frame memory 36 and defines the region where the image is to be written in the memory space of the frame memory 36. The image size adjustment is effected by supplying the reduction/filter circuit 66 with reduction factors for the vertical and horizontal directions of the image and having the reduction/filter circuit 66 reduce the image. The location of the write region in the frame memory 36 is defined by supplying a write start address from the write image adjuster 68 to the write control signal generator 72. The write control signal generator 72 sequentially generates write addresses in the write region beginning from the write start address. The write image adjuster 68 further generates addresses supplied to the line buffers 64.

The CPU write controller 70 is a circuit for generating addresses and control signals for writing the digital image signal DV3 received via the bus to the frame memory 36. The image write condition register 74 stores various conditions concerning writing of images into the frame memory 36. These conditions are set by the CPU 50 through the bus. The blocks marked [*] in FIG. 2 effect their respective processing operations in accordance with the conditions set in the image write condition register 74. The specific write conditions recorded in the image write condition register 74 include: among others, whether and what type of color conversion is to be effected by the color converter 60; the selection by the data selector 62, the reduction factors in the reduction/filter circuit 66; and the write start position in the frame memory 36.

The write clock pulse generator 76 generates a dot dock signal DCLK1 in accordance with the horizontal sync signal HSYNC1 supplied by the sync separator 32 (FIG. 1). The write clock pulse generator 76 has a PLL circuit not shown in the drawings. The frequency division factor in the PLL circuit is supplied by the image write condition register 74. The processing by the image write control section shown in FIG. 2 is effected synchronously with the dot clock signal DCLK1 and the sync signals VSYNC1, HSYNC1.

Figure 3:
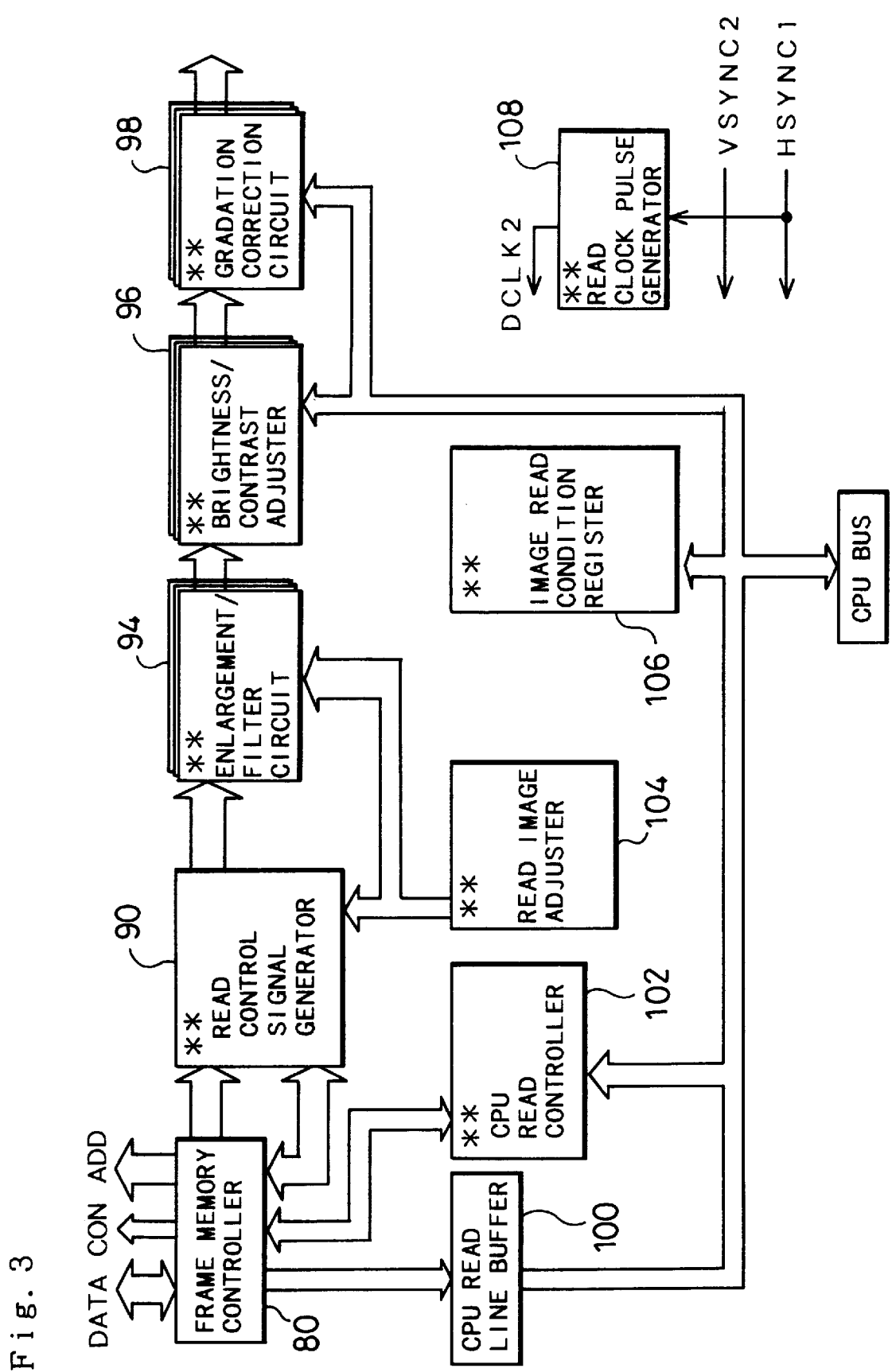
FIG. 3 is a block diagram showing the configuration of an image read control section in the video processor 38.

FIG. 3 is a block diagram showing the configuration of an image read control section in the video processor 38. The image read control section comprises the frame memory controller 80, an enlargement/filter circuit 94, a brightness/contrast adjuster 96, a gradation correction circuit 98, a CPU read line buffer 100, a CPU read controller 102, a read image adjuster 104, an image read condition register 106 and a read clock pulse generator 108.

The frame memory controller 80 shown in FIG. 3 is the same as the one shown in FIG. 2 explained earlier. The read control signal generator 90 generates the addresses and control signals for reading image signals from the frame memory 36 and supplies them to the frame memory controller 80. The enlargement/filter circuit 94 enlarges the images read from the frame memory 36 in the vertical and horizontal directions and also effects filtering with respect to lines and pixels added during enlargement. The internal configuration and operation of the enlargement/filter circuit 94 will be explained later. An image can be reduced at the time it is read by skipping some of the read addresses. This type of image reduction processing is effected by the read control signal generator 90.

The brightness/contrast adjuster 96 adjusts the brightness and contrast of the displayed image. The gradation correction circuit 98 effects gradation correction such as gamma correction using a lookup table.

The CPU read line buffer 100 is used when reading image signals from the frame memory 36 onto the bus. When image signals are read onto the bus, the CPU read controller 102 generates addresses and control signals.

The read image adjuster 104 adjusts the vertical and horizontal size of the image which is to be read from the frame memory 36 and defines the region where the image is to be read from the memory space of the frame memory 36. The image size adjustment is effected by supplying the enlargement/filter circuit 94 with enlargement factors for the vertical and horizontal directions of the image and having the enlargement/filter circuit 94 enlarge the image. The location of the read region in the frame memory 36 is defined by supplying a read start address from the read image adjuster 104 to the read control signal generator 90. The read control signal generator 90 sequentially generates read addresses in the read region beginning from the read start address.

The image read condition register 106 stores various conditions concerning reading of image from the frame memory 36. These conditions are set by the CPU 50 through the bus. The blocks marked [] in FIG. 3 effect their respective processing operations in accordance with the conditions set in the image read condition register 106. The specific read conditions recorded in the image read condition register 106 include, among others: the read start position in the frame memory 36; the enlargement factors in the enlargement/filter circuit 94; the adjustment parameters in the brightness/contrast adjuster 96; and the correction parameters in the gradation correction circuit 98**.

The read clock pulse generator 108 generates a dot clock signal DCLK2 in accordance with the horizontal sync signal HSYNC2 supplied by the liquid crystal display driver 42 (FIG. 1). The read clock pulse generator 108 has a PLL circuit not shown in the drawings. The frequency division factor in the PLL circuit is supplied by the image read condition register 106. The processing by the image read control section shown in FIG. 3 is effected synchronously with the dot dock signal DCLK2 and the sync signals VSYNC2, HSYNC2.

C. Internal configuration and operation of the reduction/filter circuit 66:

FIGS. 4(A)–4(C) are explanatory diagrams outlining the vertical direction reduction/filtering processing effected by the reduction/filter circuit 66. FIG. 4(A) shows the original image, FIG. 4(B) a reduced image obtained by the conventional reduction method, and FIG. 4(C) a reduced image produced by the reduction/filter circuit 66 of this embodiment.

The line addresses LAD of the original image are shown on the left side of each image. The reduced image shown in FIG. 4(B) is the same as that of FIG. 16(B) explained regarding the prior art. As pointed out earlier, the conventional reduction processing drops the lines whose original addresses were 1 and 6. As was explained regarding FIGS. 16(C) and 16(D), therefore, important lines are missing from the image.

As shown in FIG. 4(C), on the other hand, the reduction and filtering processing by the reduction/filter circuit 66 of the embodiment produces a weighted average between each of the dropped lines at addresses 1 and 6 and the adjacent line. For example, a weighted average is obtained between the line at line address 1 and the line immediately before it (the line at line address 0). The line at line address 1 is therefore not completely lost but remains in the reduced image as a line of somewhat lighter color than the original line. In other words, the reduction/filter circuit 66 of this embodiment can prevent the total disappearance from the reduced image of a line of one pixel width. The "filtering" effected by the reduction/filter circuit 66 means the processing for calculating the weighted average of two lines of the image signal.

Figure 5:
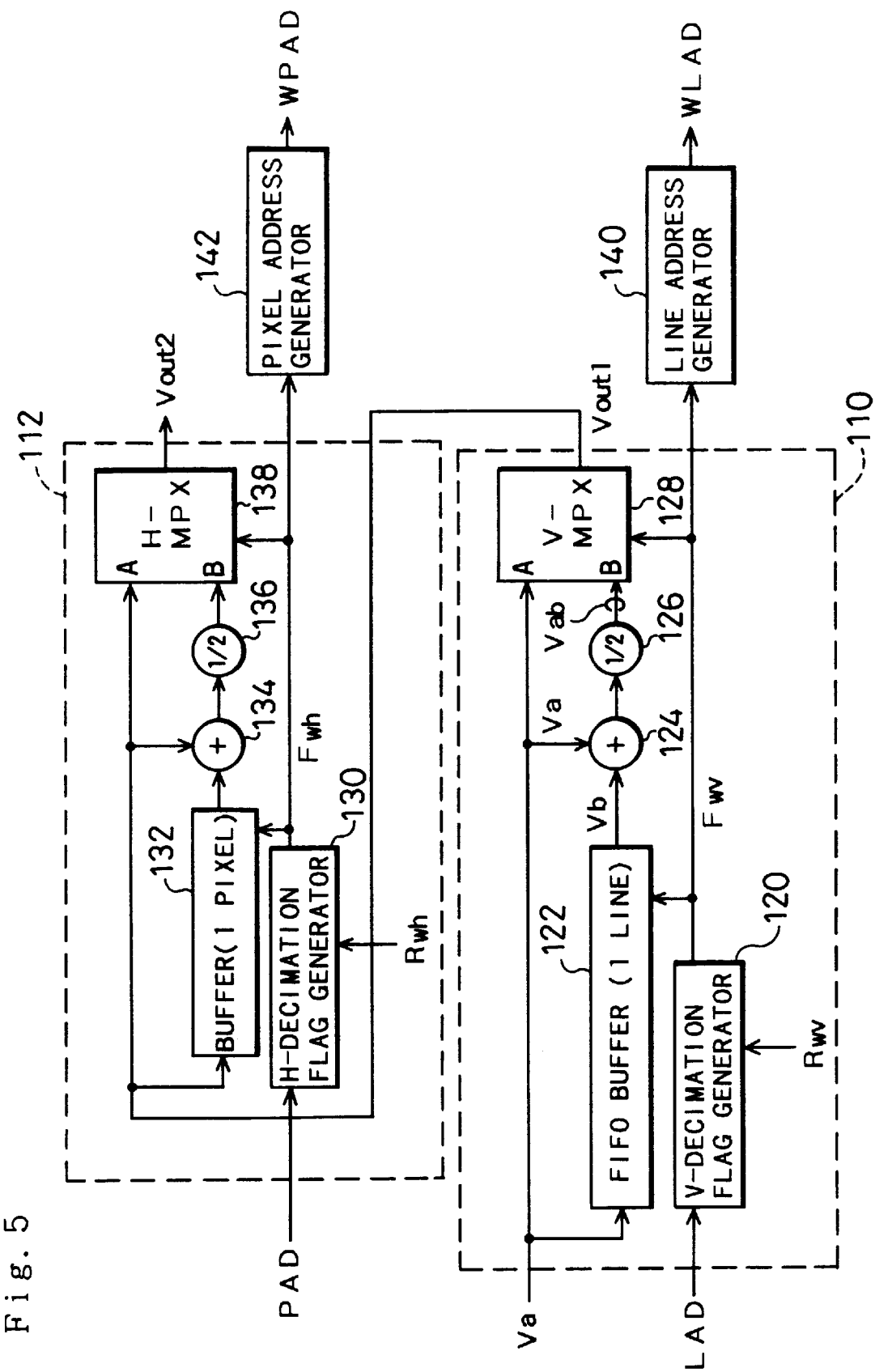
FIG. 5 is a block diagram showing the internal configuration of a reduction/filter circuit 66.

FIG. 5 is a block diagram showing the internal configuration of the reduction/filter circuit 66. The reduction/filter circuit 66 comprises a vertical reduction/filter circuit 110 and a horizontal reduction/filter circuit 112. The line address generator 140 and the pixel address generator 142 shown in FIG. 5 are included in the write control signal generator 72 shown in FIG. 2.

The vertical reduction/filter circuit 110 has a vertical decimation flag generator 120, a FIFO buffer 122, an adder 124, a multiplier 126 and a multiplexer 128. In this specification, "decimation" means image reduction processing or thinning processing. The horizontal reduction/filter circuit 112, which is configured substantially the same as the vertical reduction/filter circuit 110, has a horizontal decimation flag generator 130, a buffer 132, an adder 134, a multiplier 136 and a multiplexer 138. However, the FIFO buffer 122 of the vertical reduction/filter circuit 110 has a capacity for storing one line of image signal, whereas the buffer 132 of the horizontal reduction/filter circuit 112 has a capacity for storing one pixel of image signal.

The vertical decimation flag generator 120 receives the line address LAD and the vertical reduction factor at write Rwv from the write image adjuster 68 (FIG. 2). The line address LAD is the same line address as input to the line buffers 64 from the write image adjuster 68 for reading image signals from the line buffers 64 shown in FIG. 2. In response to the line address LAD and the vertical reduction factor Rwv, the vertical decimation flag generator 120 effects an operation explained later to generate a vertical decimation flag Fwv. The vertical decimation flag Fwv is supplied to the FIFO buffer 122, the multiplexer 128 and the line address generator 140.

One line of image signal Va supplied from the line buffers 64 (FIG. 2) is stored in the FIFO buffer 122. The image signal stored in the FIFO buffer 122 is read from the FIFO buffer 122 when the next line of the image signal is supplied from the line buffers 64. The image signal Vb read from the FIFO buffer 122 is therefore that of the line one before the line of the image signal Va input from the line buffers 64. The adder 124 adds the image signal Va supplied from the line buffers 64 and the image signal Vb read from the FIFO buffer 122, then the multiplier 126 multiplies the sum of the image signals by ½. The image signal Vab output by the multiplier 126 amounts to the average of the image signal Va from the line buffers 64 and the image signal Vb of one line earlier. The average image signal Vab is input to the B input terminal of the multiplexer 128. The image signal Va from the line buffers 64 is input to the A terminal of the multiplexer 128 unmodified. The multiplexer 128 selects and outputs one of the two input image signals Va, Vab according to the level of the vertical decimation flag Fwv.

FIG. 6 is a diagram for explaining a method for calculating various parameters related to the operation of the vertical reduction/filter circuit 110. Rwv here denotes the vertical reduction factor, LAD the original line address, WLAD the write line address sent to the frame memory 36, Fwv the vertical decimation flag generated by the vertical decimation flag generator 120, MPX the input terminal A/B selection state of the multiplexer 128, and Vout1 the original line corresponding to the image data output by the multiplexer 128.

The write line address WLAD is calculated by rounding down the product of the vertical reduction factor Rwv and the original line address LAD to the nearest integer. In the example of FIG. 6, since the vertical reduction factor Rwv is 0.8, the write line addresses WLAD are 0, 0, 1, 2, . . . . The vertical decimation flag Fwv becomes H level upon two or more consecutive repetitions of the same value of the write line address WLAD and is otherwise L level. Specifically, every time the line address LAD is updated, the vertical decimation flag generator 120 multiplies the line address LAD and the vertical reduction factor Rwv and raises the vertical decimation flag Fwv to H level if the product WLAD is the same as the product one time earlier. When the product WLAD differs from the product one time earlier, the vertical decimation flag generator 120 lowers the vertical decimation flag Fwv to the L level. It will be noted that in the example of FIG. 6 the vertical decimation flag Fwv is H level when the line address LAD is 1 and 6. As shown in FIG. 4(B), the lines having line addresses LAD of 1 and 6 are dropped in the simple reduction processing of the prior art. The vertical decimation flag Fwv indicates the lines which are to be dropped in the course of reduction.

The selection state of the multiplexer 128 (FIG. 5) is switched in accordance with the level of the vertical decimation flag Fwv. Specifically, as shown in the "MPX" column in FIG. 6, when the vertical decimation flag Fwv is L level, the image signal Va input to the A terminal of the multiplexer 128 is selected for output, and when it is H level, the image signal Vab input to the B terminal of thereof is selected for output. As mentioned earlier, the image signal Va input to the A terminal is the image signal supplied from the line buffers 64 and the image signal Vab input to the B terminal is the signal obtained by averaging the image signal Va and the image signal Vb of one line earlier. Therefore, when the vertical decimation flag Fwv is H level, the multiplexer 128 selects and outputs the signal Vab obtained by averaging the image signal Va of the dropped line and the image signal Vb of one line earlier. In the example of FIG. 6, for instance, when the image signal Va of the line whose original line address LAD is 1 is input, the image signal Vab obtained by averaging the two lines L0, L1 whose line addresses LAD are 0 and 1 is output as the output image signal Vout1. When vertical decimation flag Fwv is L level, the image signal Va from the line buffers 64 is output without modification.

As shown in FIG. 5, the vertical decimation flag Fwv is also supplied to the line address generator 140. The line address generator 140, which is part of the write control signal generator 72 (FIG. 2), actually generates the write line address WLAD sent to the frame memory 36. When the vertical decimation flag Fwv is L level, the write line address is updated synchronously with the updating of the line address LAD in the line buffers 64. On the other hand, when the vertical decimation flag Fwv is H level, update of the write line address WLAD is inhibited and the write line address WLAD is held at the same value. Thus when the vertical decimation flag Fwv is H level, the write line address WLAD is held the same as that of the preceding line. In the frame memory 36, therefore, the image signal of the immediately preceding line is overwritten with the image signal of the next line. In FIG. 6, for example, the image signal obtained by averaging the two lines L0, L1 whose line addresses LAD are 0 and 1 is written over the image signal of the line L0 whose line address LAD is 0.

Updating of the write line address WLAD in the line address generator 140 need not necessarily be controlled in accordance with the level of the vertical decimation flag Fwv as explained in the foregoing but can instead be independently controlled by the line address generator 140. For this it suffices to equip the line address generator 140 with a circuit like the vertical decimation flag generator 120 for generating a signal equivalent to the vertical decimation flag Fwv.

FIGS. 7(a)–7(i) are timing charts showing the operation of the vertical reduction/filter circuit 110. FIG. 7(a) shows the line address LAD in the line buffers 64, FIG. 7(b) the write line address WLAD and FIG. 7(c) the vertical decimation flag Fwv. Write control signal FW# shown in FIG. 7(d) and read control signal FR# shown in FIG. 7(e) are signals enabling write and read at the FIFO buffer 122. They are supplied from a FIFO control circuit not shown in the figures. The signals FW# and FR# are negative logic signals enabling image signal write or read only at L level. As is obvious from FIGS. 7(c)–7(e), at a line whose vertical decimation flag Fwv is L level, write of the image signal to the FIFO buffer 122 is enabled and read from the FIFO buffer 122 is inhibited. At a line whose vertical decimation flag Fwv is H level, on the other hand, write of the image signal to the FIFO buffer 122 is inhibited and read from the FIFO buffer 122 is enabled.

As shown at FIGS. 7(a) and 7(f), the line address LAD of the image signal Va sent from the line buffers 64 to the vertical reduction/filter circuit 110 is sequentially increased in increments of one. As shown at FIG. 7(g), the image signal Vb is read from the FIFO buffer 122 only when the vertical decimation flag Fwv is H level. When the original line address LAD is 1, the arithmetic average of the image signal Va shown at FIG. 7(f) and the image signal Vb shown at FIG. 7(g) is calculated to create the image signal Vab shown at FIG. 7(h). This image signal Vab is output from the multiplexer 128 (FIG. 7(i)).

Thus by obtaining the arithmetic average of each line that would be dropped by the simple reduction processing of the prior art and the immediately preceding line, the vertical reduction/filter circuit 110 shown in FIG. 5 generates a single line including information from both lines. Therefore, since no line is completely dropped, disappearance of an important horizontal line from the reduced image can be prevented. Since lines not adjacent to those lines which are to be dropped by reduction are not processed by filtering (or arithmetic averaging), the sharpness of the image is not appreciably degraded by the filtering.

Since the vertical reduction/filter circuit 110 needs only the FIFO buffer 122 having a capacity of one line for temporarily storing image signals, it has the merit of a relatively small buffer memory capacity. Further, since the vertical reduction/filter circuit 110 can filter and output the lines of the image signal sequentially supplied line by line in real time, it can process and output dynamic image signals at high speed.

The horizontal reduction/filter circuit 112 shown in FIG. 5 has almost the same configuration as the vertical reduction/filter circuit 110. It differs from the vertical reduction/filter circuit 110 only in the capacity of its buffer. Namely, the buffer 132 of the horizontal reduction/filter circuit 112 has a memory capacity of one pixel, whereas the FIFO buffer 122 of the vertical reduction/filter circuit 110 has a memory capacity of one line. Since the horizontal reduction/filter circuit 112 therefore effects substantially the same kind of reduction/filtering processing as described above, its operation can be easily understood by replacing the term "one line" in the foregoing explanation of the vertical reduction/filter circuit 110 with the term "one pixel." The horizontal reduction/filter circuit 112 thus subjects the image signal Vout1 output by the vertical reduction/filter circuit 110 to horizontal reduction and filtering effected in parallel. This processing is effected in accordance with the level of a horizontal decimation flag Rwh generated by the horizontal decimation flag generator 130. The pixel address generator 142 controls updating of the write pixel address WPAD of the frame memory 36 in accordance with the level of the horizontal decimation flag Rwh. Thus by calculating the arithmetic average of 1) each pixel that would be dropped by the simple reduction processing of the prior art and 2) the immediately preceding pixel, a single pixel that includes image information from both pixels is generated. Therefore, since no pixel is completely dropped at each line, disappearance of an important non-horizontal line segment of one pixel width from the reduced image can be also prevented. Since pixels not adjacent to those pixels which are to be dropped by reduction are not processed by filtering (or arithmetic averaging), the sharpness of the image is not appreciably degraded by the filtering.

The vertical reduction factor Rwv in the vertical reduction/filter circuit 110 and the horizontal decimation flag Rwh in the horizontal reduction/filter circuit 112 can be set independently. The effect of preventing line and pixel dropping during reduction is pronounced when each of these reduction factors is in the range of 0.5 to 1. This is because within this range only one line or one pixel is dropped at each location. The reduction factors can of course be set to values below this range if desired.

While the vertical reduction/filter circuit 110 and the horizontal reduction/filter circuit 112 shown in FIG. 5 employ circuits for calculating the simple arithmetic average of the two sets of data (the adder 124 or 134 and the multiplier 126 or 136), they can instead employ circuits for calculating a weighted arithmetic average (weighted average).

The order of the vertical reduction/filter circuit 110 and the horizontal reduction/filter circuit 112 can be reversed from that shown in FIG. 5. That is, the horizontal reduction by the horizontal reduction/filter circuit 112 can be effected before the vertical reduction by the vertical reduction/filter circuit 110.

D. Outline of configuration and operation of the enlargement/filter circuit 94:

FIGS. 8(A)–8(D) are explanatory diagrams outlining the internal configuration and the nature of the processing effected by the enlargement/filter circuit 94 for enlarging images read from the frame memory 36. The enlargement/filter circuit 94 comprises two enlargement/interpolation circuits 150, 152 connected in series. The first enlargement/interpolation circuit 150 enlarges the input image signal V1 by M1 times and generates the image portions to be added by the enlargement by interpolation from the preceding and following image portions. The first enlargement factor M1 is in the range of 1 to 2. The second enlargement/interpolation circuit 152 enlarges the image signal V2 received from the first enlargement/interpolation circuit 150 by M2 times and generates the image portions to be added by the enlargement by interpolation from the preceding and following image portions. The second enlargement factor M2 is an integer. As shown at FIG. 8(B), the enlargement factor of the image output by the second enlargement/interpolation circuit 152 is equal to the product of the two enlargement factors M1 and M2.

This series provision of the first enlargement/interpolation circuit 150 for enlarging the image by the first enlargement factor M1 in the range of 1 to 2 and the second enlargement/interpolation circuit 152 for enlarging the image by the integer value of second enlargement factor M2 enables appropriate processing to be effected within the respective enlargement factor ranges. This is explained further below. It is therefore possible to enlarge an image by a desired enlargement factor (M1×M2) including a fractional component without appreciably degrading image quality.

E. Configuration and operation of the first enlargement/interpolation circuit 150:

FIGS. 9(A)–9(C) are explanatory diagrams outlining the vertical enlargement/interpolation processing effected by the first enlargement/interpolation circuit 150. FIG. 9(A) shows the original image, FIG. 9(B) an enlarged image obtained by the conventional enlargement method, and FIG. 9(C) an enlarged image produced by the first enlargement/interpolation circuit 150 of this embodiment.

Figure 17A:
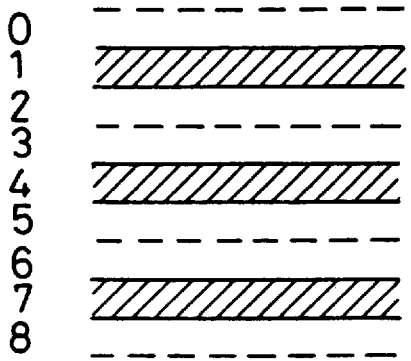
FIGS. 17(A) and 17(B) are diagrams for explaining the nature of conventional vertical image enlargement processing.
Figure 17B:
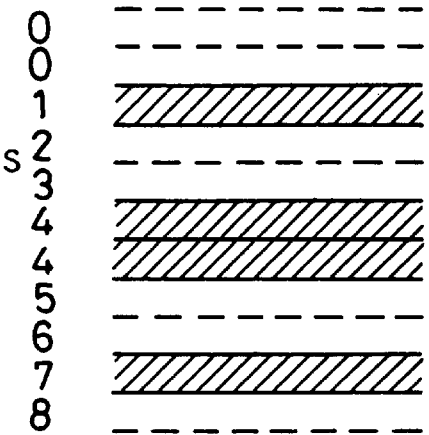

The read line addresses RLAD at time of reading the image from the frame memory 36 are shown on the left side of each image. The enlarged image shown in FIG. 9(B) is the same as the enlarged image of FIG. 17(B) explained regarding the prior art. As pointed out earlier, the conventional enlargement processing merely adds the lines whose original addresses were 0 and 4. The width of lines included in the image therefore become excessively thick.

As shown in FIG. 9(C), on the other hand, the enlargement/interpolation processing by the first enlargement/interpolation circuit 150 of this embodiment generates a line to be added by calculating a weighted average of the two lines of the original image located before and after the line to be added. For example, the line to be added between line addresses 4 and 5 is generated by calculating a weighted average of these two lines. The line at line address 4 therefore does not become thick and a line of somewhat lighter color is merely added. In other words, the first enlargement/interpolation circuit 150 of this embodiment can prevent the lines in the image from simply being made thicker by the enlargement. The "interpolation" effected by the first enlargement/interpolation circuit 150 means the processing for calculating the weighted average of two lines of the image signal located before and after the line to be added.

Figure 10:
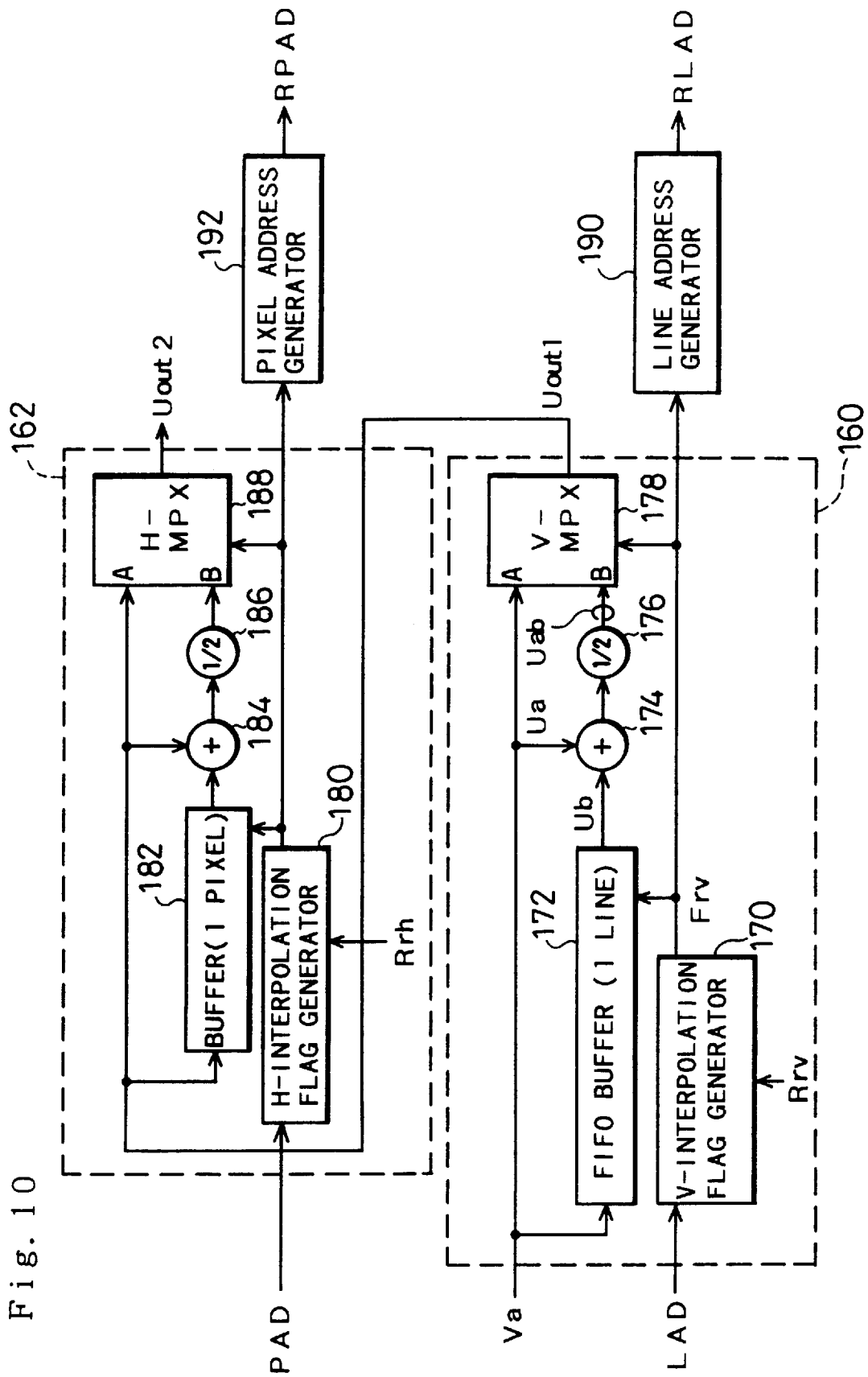
FIG. 10 is a block diagram showing the internal configuration of the first enlargement/interpolation circuit 150.

FIG. 10 is a block diagram showing the internal configuration of the first enlargement/interpolation circuit 150. The first enlargement/interpolation circuit 150 comprises a vertical enlargement/interpolation circuit 160 and a horizontal enlargement/interpolation circuit 162. The line address generator 190 and the pixel address generator 192 shown in FIG. 10 are included in the read control signal generator 90 shown in FIG. 3.

The vertical enlargement/interpolation circuit 160 has a vertical interpolation flag generator 170, a FIFO buffer 172, an adder 174, a multiplier 176 and a multiplexer 178. The horizontal enlargement/interpolation circuit 162 is configured substantially the same as the vertical enlargement/interpolation circuit 160. The circuit 162 has a horizontal interpolation flag generator 180, a buffer 182, an adder 184, a multiplier 186 and a multiplexer 188. However, the FIFO buffer 172 of the vertical enlargement/interpolation circuit 160 has the capacity to store one line of image signal, whereas the buffer 182 of horizontal enlargement/interpolation circuit 162 has the capacity to store one pixel of image signal.

Comparing FIG. 10 with FIG. 5, it is easily understood that the vertical enlargement/interpolation circuit 160 shown in FIG. 10 is obtained by replacing the vertical decimation flag generator 120 of the vertical reduction/filter circuit 110 shown in FIG. 5 with the vertical interpolation flag generator 170. Further, the horizontal enlargement/interpolation circuit 162 shown in FIG. 10 is obtained by replacing the horizontal decimation flag generator 130 of the horizontal reduction/filter circuit 112 shown in FIG. 5 with the horizontal interpolation flag generator 180.

The vertical interpolation flag generator 170 receives the line address LAD and the first enlargement factor Rrv for the vertical direction at read from the read image adjuster 104 (FIG. 3). The line address LAD is incremented by one each time one line has been processed by the vertical enlargement/interpolation circuit 160. Although the line addresses LAD differ from those the addresses shown in FIG. 5, they are assigned the same reference symbols as those in FIG. 5 for convenience of illustration. In response to the line address LAD and the vertical enlargement factor Rrv, the vertical interpolation flag generator 170 effects an operation explained later to generate a vertical interpolation flag Frv. The vertical interpolation flag Frv is supplied to the FIFO buffer 172, the multiplexer 178 and the line address generator 190.

One line of image signal Ua read from the frame memory 36 is stored in the FIFO buffer 172. The image signal stored in the FIFO buffer 172 is read from the FIFO buffer 172 when the next line of the image signal is supplied from the frame memory 36. The image signal Ub read from the FIFO buffer 172 is therefore that of the line one before the line of the image signal Ua read from the frame memory 36. The adder 174 adds the image signal Ua read from the frame memory 36 and the image signal Ub read from the FIFO buffer 172. The multiplier 176 multiplies the sum of the image signals by 1/2. The image signal Uab output by the multiplier 126 therefore amounts to the average of the image signal Ua read from the frame memory 36 and the image signal Ub of one line earlier. The average image signal Uab is input to the B input terminal of the multiplexer 178. The image signal Ua read from the frame memory 36 is input to the A terminal of the multiplexer 178 unmodified. The multiplexer 178 selects and outputs one of the two input image signals Ua, Uab according to the level of the vertical interpolation flag Frv.

FIG. 11 is a diagram for explaining a method for calculating various parameters related to the operation of the vertical enlargement/interpolation circuit 160. Rrv here denotes the vertical enlargement factor, LAD the sequentially updated line address, LAD/Rrv the quotient of the line address LAD divided by the vertical enlargement factor Rrv, RLAD the read line address sent to the frame memory 36, LFIFO the original line of the image signal stored in the FIFO buffer 172, Frv the vertical interpolation flag generated by the vertical interpolation flag generator 170, MPX the input terminal A/B selection state of the multiplexer 178, and Uout1 the original line corresponding to the image data output by the multiplexer 178. The line address LAD which is sequentially updated line by line can be considered to represent the image line number output by the vertical enlargement/interpolation circuit 160.

The values of "LAD/Rrv" in the third column from the left in FIG. 11 are obtained by dividing the line addresses LAD by the vertical enlargement factor Rrv. In the example of FIG. 11, since the vertical enlargement factor Rrv is 1.25, LAD/Rrv equals 0, 0, 1, 2, . . . . As indicated by arrows in FIG. 11, the vertical interpolation flag Frv becomes H level upon two or more consecutive repetitions of the same value of the quotient LAD/Rrv and is otherwise L level. Specifically, every time the line address LAD is updated, the vertical interpolation flag generator 170 divides the line address LAD by the vertical enlargement factor Rrv and raises the vertical interpolation flag Frv to H level if the quotient (LAD/Rrv) is the same as the previous quotient. When the quotient differs from the previous quotient, the vertical interpolation flag generator 170 lowers the vertical interpolation flag Frv to the L level. It will be noted in the example of FIG. 11 that the vertical interpolation flag Frv is H level when the original line address LAD is 1 and 6. As shown in FIG. 9(B) discussed earlier, the lines having line addresses LAD of 1 and 6 are added in the simple enlargement processing of the prior art. The vertical interpolation flag Frv indicates the lines which are to be added in the course of enlargement.

The selection state of the multiplexer 178 (FIG. 10) is switched in accordance with the level of the vertical interpolation flag Frv. Specifically, as shown in the "MPX" column in FIG. 11, when the vertical interpolation flag Frv is L level, the image signal Ua input to the A terminal of the multiplexer 178 is selected for output, and when the flag is H level, the image signal Uab input to the B terminal of thereof is selected for output. As mentioned earlier, the image signal Ua input to the A terminal is the image signal being read from the frame memory 36 and the image signal Uab input to the B terminal is the signal obtained by averaging the image signal Ua and the image signal Ub of one line earlier. Therefore, when the vertical interpolation flag Frv is H level, the multiplexer 178 selects and outputs the signal Uab obtained by averaging the image signal Ua of the line being read from the frame memory 36 and the image signal Ub of one line earlier. In the example of FIG. 11, for instance, when the image signal Ua of the line whose original line address LAD is 1 is input, the image signal Uab obtained by averaging the two lines whose line addresses LAD are 0 and 1 is output as the output image signal Uout1. When the vertical interpolation flag Frv is L level, the image signal Ua read from the frame memory 36 is output without modification.

As shown in FIG. 10, the vertical interpolation flag Frv is also supplied to the line address generator 190. The line address generator 190, which is part of the read control signal generator 90 (FIG. 3), actually generates the read line address RLAD sent to the frame memory 36. As shown in FIG. 11, when the vertical interpolation flag Frv is L level, the read line address RLAD is at the next line updated synchronously with the updating of the original line address LAD. On the other hand, when the vertical interpolation flag Frv is H level, update of the read line address RLAD is inhibited at the next line and the read line address RLAD is held at the same value, as indicated by arrows in FIG. 11. Thus when the vertical interpolation flag Frv is H level, the read line address RLAD is held the same as that of the preceding line. The image signal read from the frame memory 36 is therefore that of the same line as read the preceding time. In FIG. 11, for example, when the line address LAD is 1 and 2, the image signal of the line whose read line address RLAD is 1 is read twice in succession.

As shown in the "LFIFO" column in FIG. 11, the image signal read from the FIFO buffer 172 is that of the line one before the line of the image signal read from the frame memory 36.

The updating of the read line address RLAD in the line address generator 190 need not necessarily be controlled in accordance with the level of the vertical interpolation flag Frv as explained in the foregoing but can instead be independently controlled by the line address generator 190.

FIGS. 12(a)–12(i) are timing charts showing the operation of the vertical enlargement/interpolation circuit 160. FIG. 12(a) shows the line address LAD of the output image signal, FIG. 12(b) the read line address RLAD and FIG. 12(c) the vertical interpolation flag Frv. Write control signal FW# shown in FIG. 12(d) and read control signal FR# shown in FIG. 12(e) enable write and read at the FIFO buffer 172. They are supplied from a FIFO control circuit not shown in the figures. The signals FW# and FR# are negative logic signals enabling image signal write or read only at L level. As is obvious from FIGS. 12(c)–12(e), at a line whose vertical interpolation flag Frv is L level, write of the image signal to the FIFO buffer 172 is enabled and read from the FIFO buffer 172 is inhibited. At a line whose vertical interpolation flag Frv is H level, on the other hand, write of the image signal to the FIFO buffer 172 is inhibited and read from the FIFO buffer 172 is enabled.

As shown at FIG. 12(f), the line address of the image signal Ua read from the frame memory 36 is not updated when the vertical interpolation flag Frv is H level and is incremented by one when it is L level. As shown at FIG. 12(g), the image signal Ub is read from the FIFO buffer 172 only when the vertical interpolation flag Frv is H level. When the line address LAD of the image output by the first enlargement/interpolation circuit 150 is 1, the arithmetic average of the image signal Ua of line R0 shown at FIG. 12(f) and the image signal Ub of line R1 shown at FIG. 12(g) is calculated to create the image signal Uab shown at FIG. 12(h). This image signal Uab is output from the multiplexer 178 (FIG. 12(i)).

Thus the vertical enlargement/interpolation circuit 160 shown in FIG. 10 generates each line that would be simply added by the enlargement processing of the prior art by obtaining the arithmetic average of the lines located before and after the line to be added. Therefore, simple thickening of horizontal lines in the image can be prevented. Since lines not adjacent to those lines which are to be added by enlargement are not processed by interpolation (or arithmetic averaging), the sharpness of the image is not appreciably degraded by the interpolation.

Since the vertical enlargement/interpolation circuit 160 needs only the one-line FIFO buffer 172 as buffer memory for temporarily storing image signals, it has the merit of requiring only relatively small buffer memory capacity. Further, since the vertical enlargement/interpolation circuit 160 can filter and output the lines of the image signal sequentially supplied line by line in real time, it can process and output dynamic image signals at high speed.

The horizontal enlargement/interpolation circuit 162 shown in FIG. 10 has almost the same configuration as the vertical enlargement/interpolation circuit 160. Since it therefore effects substantially the same kind of enlargement/interpolation processing as described above, its operation can be easily understood by replacing the term "one line" in the foregoing explanation of the vertical enlargement/interpolation circuit 160 with the term "one pixel." The horizontal enlargement/interpolation circuit 162 prevents non-horizontal lines from being excessively thickened by the enlargement of the image. Moreover, since pixels not adjacent to pixels added by enlargement are not processed by interpolation (or arithmetic averaging), the sharpness of the image is not appreciably degraded by the interpolation.

The vertical enlargement factor Rrv in the vertical enlargement/interpolation circuit 160 and the horizontal enlargement factor Rrh in the horizontal enlargement/ interpolation circuit 162 can be set independently. The effect of preventing line thickening during enlargement is pronounced when each of these enlargement factors in the range of 1 to 2. This is because within this range only one line or one pixel is added at each location.

The connection order of the vertical enlargement/interpolation circuit 160 and the horizontal enlargement/interpolation circuit 162 can be reversed from that shown in FIG. 5. That is, the horizontal enlargement by the horizontal enlargement/interpolation circuit 162 can be effected before the vertical enlargement by the vertical enlargement/interpolation circuit 160.

F. Configuration and operation of the second enlargement/interpolation circuit 152:

FIGS. 13(A) and 13(B) are explanatory diagrams outlining the vertical enlargement/interpolation processing effected by the second enlargement/interpolation circuit 152. FIG. 13(A) shows the image after enlargement by the first enlargement/interpolation circuit 150 and FIG. 13(B) an enlarged image produced by the second enlargement/interpolation circuit 152. The image of FIG. 13(A) will be hereinafter referred to as the "original image."

The line numbers L0, L1, . . . of the original image are shown at the left of each image. The second enlargement/interpolation circuit 152 effects processing for enlarging the original image Nv times in the vertical direction. The jth line $L_{NV}$ to be added during enlargement is linearly interpolated by calculating a weighted average of the two lines $L_{i-1}$, $L_i$ of the original image located before and after the added line. The calculation is made by the Equation (1):

$$L_{NV}=(1-\alpha v) \times L_{i-1} + \alpha v \times L_i \quad (1)$$

where $\alpha v=j/Nv$, $j=1\sim(Nv-1)$.

Figure 14:
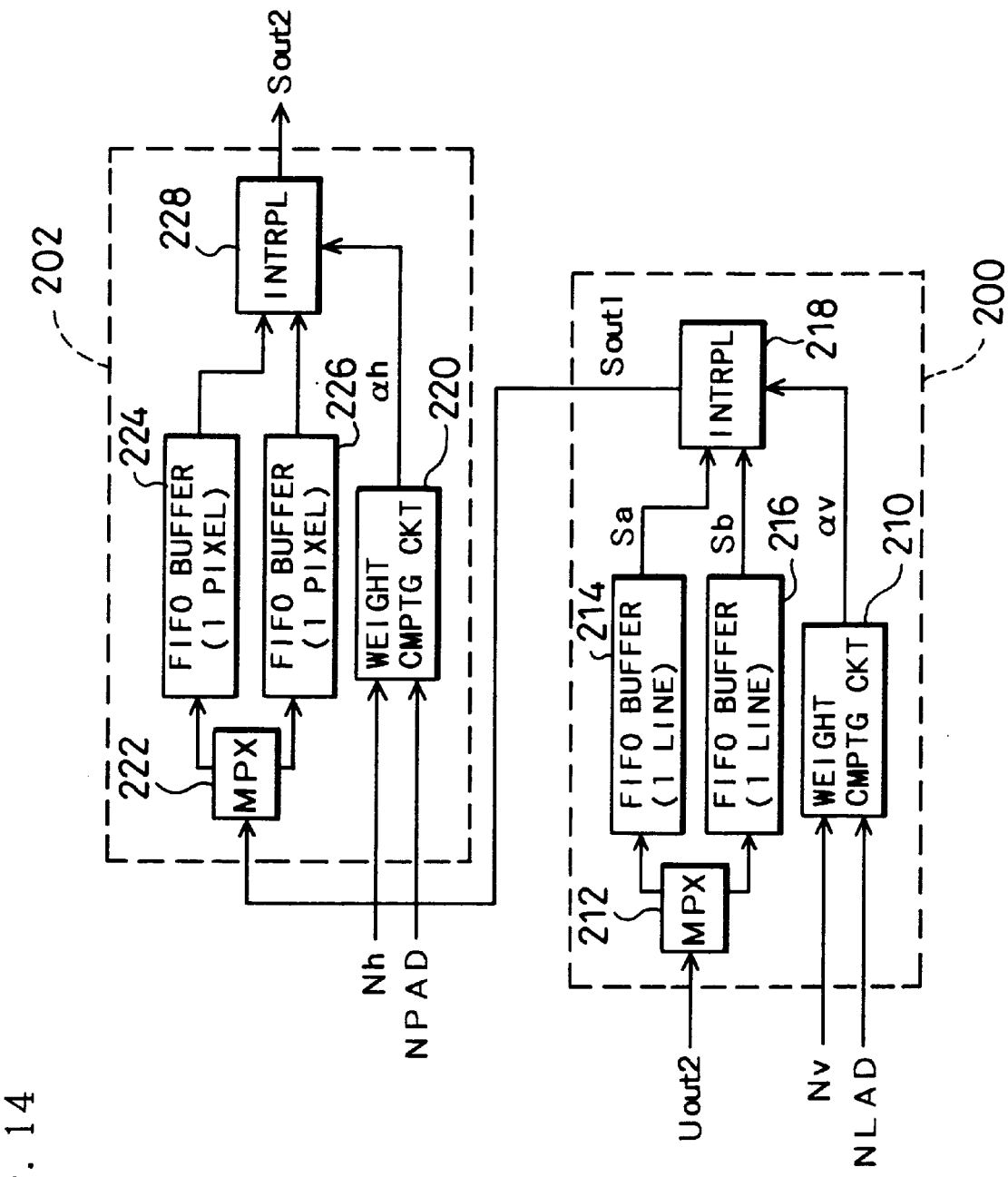
FIG. 14 is a block diagram showing the internal configuration of the second enlargement/interpolation circuit 152.

FIG. 14 is a block diagram showing the internal configuration of the second enlargement/interpolation circuit 152. The circuit 152 comprises a vertical enlargement/interpolation circuit 200 and a horizontal enlargement/interpolation circuit 202.

The vertical enlargement/interpolation circuit 200 has a weight computing circuit 210, a multiplexer 212, two FIFO buffers 214, 216, and an interpolation processor 218. The horizontal enlargement/interpolation circuit 202, which is configured substantially the same as the vertical enlargement/interpolation circuit 200, has a weight computing circuit 220, a multiplexer 222, two buffers 224, 226, and an interpolation processor 228. However, the two buffers 214, 216 of the vertical enlargement/interpolation circuit 200 each has a capacity for storing one line of image signal, whereas the buffers 224, 226 of the horizontal enlargement/interpolation circuit 202 each has a capacity for storing one pixel of image signal.

The weight computing circuit 210 receives the line address NLAD and the second enlargement factor Nv for the vertical direction at read from the read image adjuster 104 (FIG. 3). The line address NLAD is incremented by one each time one line has been processed by the vertical enlargement/interpolation circuit 200. The relationship between line address NLAD and line address LAD in the first enlargement/interpolation circuit 150 mentioned above will be explained later.

The weight computing circuit 210 computes the weight $\alpha v$ based on the line address NLAD and the vertical enlargement factor Nv by Equation (2):

$$\alpha v = \{(NLAD)\%Nv\}/Nv \quad (2)$$

The term enclosed by { } on the left side of Equation (2) takes a value in the range of 1~(Nv−1) for lines added by enlargement. The definition is thus the same as that of weight $\alpha v$ in Equation (1). The weight $\alpha v$ is supplied to the interpolation processor 218.

The lines of image signal Uout2 output one by one by the first enlargement/interpolation circuit 150 are alternately stored in the two FIFO buffers 214, 216 by the switching operation of the multiplexer 212. The image signals Sa, Sb read from the FIFO buffers 214, 216, respectively, are input to the interpolation processor 218. The interpolation processor 218 uses the weight $\alpha v$ from the weight computing circuit 210 to calculate a weighted average of the two image signals Sa, Sb, thereby executing the interpolation computation by Equation (1). The image signal Sout1 output by the interpolation processor 218 represents an image enlarged Nv times in the vertical direction.

FIGS. 15(a)–15(f) are timing charts showing the operation of the vertical enlargement/interpolation circuit 200 of the second enlargement/interpolation circuit 152. FIG. 15(a) shows the line address NLAD in the second enlargement/interpolation circuit 152, FIG. 15(b) the line address LAD of the output image of the aforesaid first enlargement/interpolation circuit 150 and FIG. 15(c) the output image Uout2 of the first enlargement/interpolation circuit 150. FIGS. 15(d), 15(e) and 15(f) respectively show the image signals Sa, Sb input to the interpolation processor 218 shown in FIG. 14 and the output image signal Sout1 thereof.

As shown at FIGS. 15(a) and 15(b), updating of the line address NLAD in the second enlargement/interpolation circuit 152 is effected at twice the rate (half the period) of the updating of the line address LAD of the output image of the first enlargement/interpolation circuit 150. In general, the update rate of the line address NLAD in the second enlargement/interpolation circuit 152 is Nv times that of the line address LAD of the output image of the first enlargement/interpolation circuit 150, where Nv is the vertical enlargement factor in the second enlargement/interpolation circuit 152. As shown at FIG. 15(b), therefore, updating of line address LAD in the second enlargement/interpolation circuit 152 at intervals separated by (Nv−1) rest cycles. While the line address LAD rest cycles are omitted from FIG. 12 explained earlier for ease of illustration, line address LAD is actually updated at intervals separated by rest cycles as shown in FIG. 15(b).

The image signal Uout2 input from the first enlargement/interpolation circuit 150 is alternately written to the two FIFO buffers 214, 216 one line at a time and is read in the cycle following the write cycle. The interpolation processor 218 generates the output image signal Sout1 shown at FIG. 15(f) by effecting an interpolation calculation on the two input image signals Sa, Sb shown at FIGS. 15(d) and 15(e) using the weight $\alpha v$.

Since the vertical enlargement/interpolation circuit 200 of the second enlargement/interpolation circuit 152 thus generates lines to be added for enlargement by linear interpolation between two lines in the original image located before and after the line to be added, a smooth enlarged image can be obtained.

The horizontal enlargement/interpolation circuit 202 shown in FIG. 14 has almost the same configuration as the vertical enlargement/interpolation circuit 200. Since it therefore effects substantially the same kind of enlargement/interpolation processing as described above, its operation can be easily understood by replacing the term "one line" in the foregoing explanation of the vertical enlargement/interpolation circuit 200 with the term "one pixel." The update period of pixel address NPAD in the second enlargement/interpolation circuit 152 is preferably Nh times that of the pixel address PAD in the first enlargement/ interpolation circuit 150, where Nh is the horizontal enlargement factor in the second enlargement/interpolation circuit 152.

The vertical enlargement factor Nv in the vertical enlargement/interpolation circuit 200 of the second enlargement/interpolation circuit 152 and the horizontal enlargement factor Nh in the horizontal enlargement/ interpolation circuit 202 can be set independently. The connection order of the vertical enlargement/interpolation circuit 200 and the horizontal enlargement/interpolation circuit 202 can be reversed from that shown in FIG. 14. That is, the horizontal enlargement by the horizontal enlargement/ interpolation circuit 202 can be effected before the vertical enlargement by the vertical enlargement/interpolation circuit 200.

As explained in the foregoing, the described embodiment of the image processing system is equipped with the first enlargement/interpolation circuit 150 which effects enlargement at a first enlargement factor in the range of 1 to 2 and the second enlargement/interpolation circuit 152 which effects enlargement at a second enlargement factor that is an integral value. Therefore, by appropriately selecting a combination of the two enlargement factors, the image processing system can enlarge an image by an arbitrary total enlargement factor including a fractional component.

In the above embodiment, some constituent elements implemented by hardware can instead be implemented by computer programs and, conversely, some constituent elements implemented by computer programs can instead by implemented by hardware.

Although in the described embodiment image line dropping due to reduction and image line thickening due to enlargement are both mitigated by effecting weighted-averaging on the image data, such dropping and thickening of image lines can instead be mitigated by any of various types of interpolation other tha weighted-averaging. Usable types of interpolation include, for example, geometric average interpolation, linear interpolation and nonlinear interpolation.

Interpolation of lines dropped due to reduction is not limited to that of interpolation between the dropped line and a line adjacent to the dropped line and, as a general principle, it is possible to effect the interpolation using a plurality of lines including these two lines. The same applies to interpolation of pixels dropped due to reduction. Further, interpolation of lines added due to enlargement is not limited to that of interpolation between two lines located before and after the line to be added and, as a general principle, it suffices to effect the interpolation using a plurality of lines adjacent to the line to be added.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
a frame memory configured to store image data;
a vertical reduction unit configured to reduce a first image represented by the image data in the vertical direction when the image data are written to the frame memory, the vertical reduction unit including:
  a first detector configured to detect a first line which is to be dropped by the reduction, and
  a first interpolator configured to interpolate a plurality of lines of the image data including the first line and a second line adjacent to the first line to modify an image portion of the second line while maintaining image data of other lines which are not adjacent to the first line to be dropped by the reduction; and
a horizontal reduction unit configured to reduce a second image represented by the image data in the horizontal direction, the horizontal reduction unit including:
  a second detector configured to detect a first pixel which is to be dropped by the reduction, and
  a second interpolator configured to interpolate a plurality of pixels of the image data including the first pixel and a second pixel adjacent to the first pixel to modify an image portion of the second pixel while maintaining image data of other pixels which are not adjacent to the first pixel to be dropped by the reduction.

2. The image processing apparatus according to claim 1, wherein each of the vertical reduction unit and the horizontal reduction unit further comprises:
a buffer memory configured to store a prescribed amount of input image data;
a weighted-averaging unit configured to obtain a weighted-average of first image data read from the buffer memory and second image data representing an image portion immediately following the first image data to produce third image data; and
a selector configured to select and output one set from among a plurality of sets of image data including the input second image data and the third image data output by the weighted-averaging unit;
wherein the detector includes a selection signal generator configured to generate from an image reduction factor a selection signal indicating an image portion which is to be dropped by the reduction and supplying the selection signal to the selector.

3. An image processing apparatus according to claim 2, further comprising a write address controller responsive to the selection signal configured to control incrementing of a write address input to the frame memory.

4. An image processing apparatus according to claim 1, wherein the vertical reduction unit and the horizontal reduction unit each has a reduction factor in the range of 0.5 to 1, whereby the image portion which is to be dropped by the reduction in the vertical reduction unit is one line per location and the image portion which is to be dropped by the reduction in the horizontal reduction unit is one pixel per location.

5. An image processing apparatus comprising:
a frame memory for storing image data;
a vertical enlargement unit configured to enlarge a first image represented by the image data read from the frame memory in the vertical direction, the vertical enlargement unit including
  a first detector configured to detect a first line which is to be added by the enlargement, and
  a first interpolator configured to interpolate a plurality of lines of the image data adjacent to the first line to generate image data for the first line while maintaining image data of other lines which are not adjacent to the first line to be added by the enlargement, and
a horizontal enlargement unit configured to enlarge a second image represented by the image data in the horizontal direction, the horizontal enlargement unit including:
  a second detector configured to detect a first pixel which is to be added by the enlargement, and a second interpolator configured to interpolate a plurality of pixels of the image data adjacent to the first pixel to generate image data for the first pixel while maintaining image data of other pixels which are not adjacent to the first pixel to be added by the enlargement.

6. An image processing apparatus according to claim 5, wherein each of the vertical enlargement unit and the horizontal enlargement unit further comprises:

a buffer memory for storing a prescribed amount of input image data;

a weighted-averaging unit configured to obtain a weighted-average of first image data read from the buffer memory and second image data representing an image portion immediately following the first image data to produce third image data; and a selector configured to select and output one set from among a plurality of sets of image data including the input second image data and the third image data output by the weighted-averaging unit; and wherein the detector includes a selection signal generator configured to generate from an image enlargement factor a selection signal indicating an image portion which is to be added by the enlargement and to supply the selection signal to the selector.

7. An image processing apparatus according to claim 6, further comprising a read address controller responsive to the selection signal for controlling incrementing of a read address input to the frame memory.

8. An image processing apparatus according to claim 5, wherein the vertical enlargement unit and the horizontal enlargement unit each has an enlargement factor in the range of 1 to 2, whereby the image portion which is to be added by the enlargement in the vertical enlargement unit is one line per location and the image portion which is to be added by the enlargement in the horizontal enlargement unit is one pixel per location.

9. An image processing apparatus for enlarging an image comprising:

a first enlargement unit configured to enlarge a first image in by a first enlargement factor in the range of 1 to 2; and a second enlargement unit configured to enlarge a second image by a second enlargement factor that is an integer;

wherein the first and second enlargement units execute in a prescribed order to enlarge the image by a third enlargement factor equal to the product of the first and second enlargement factors.

10. An image processing apparatus according to claim 9, wherein:

the first enlargement unit executes before the second enlargement unit; and the second enlargement unit outputs image data at a second output rate which is equal to a product of a first output rate of the first enlargement unit and the second enlargement factor.

11. An image processing method comprising the steps of:

(a) reducing a first image represented by image data in the vertical direction when the image data are written to a frame memory, the step of reducing in the vertical direction further comprising the steps of:

detecting a first line which is to be dropped by the reduction, and interpolating a plurality of lines of the image data including the first line and a second line adjacent to the first line to modify an image portion of the second line while maintaining image data of other lines which are not adjacent to the first line to be dropped by the reduction; and (b) reducing a second image represented by the image data in the horizontal direction, the step of reducing in the horizontal direction further comprising the steps of:

detecting a first pixel which is to be dropped by the reduction, and interpolating a plurality of pixels of the image data including the first pixel and a second pixel adjacent to the first pixel to modify an image portion of the second pixel while maintaining image data of other pixels which are not adjacent to the first pixel to be dropped by the reduction.

12. An image processing method according to claim 11, wherein each of the steps (a) and (b) comprises the steps of:

storing a prescribed amount of input image data in a buffer memory;

obtaining a weighted-average of first image data read from the buffer memory and second linage data representing an image portion immediately following the first image data to produce third image data;

generating from an image reduction factor a selection signal indicating an image portion which is to be dropped by the reduction; and selecting in response to the selection signal and outputting one set from among a plurality of sets of image data including the input second image data and the third image data output by the weighted-averaging unit.

13. An image processing method according to claim 12, further comprising the step of controlling incrementing of a write address input to the frame memory responsive to the selection signal.

14. An image processing method according to claim 11, wherein the each of the steps (a) and (b) uses a reduction factor in the range of 0.5 to 1, whereby the image portion which is to be dropped by the reduction in the step (a) is one line per location and the image portion which is to be dropped by the reduction in the step (b) is one pixel per location.

15. An image processing method comprising the steps of:

(a) enlarging a first image represented by image data read from a frame memory in the vertical direction, the step of enlarging in the vertical direction further comprising the steps of:

detecting a first line which is to be added by the enlargement, and interpolating a plurality of lines of the image data adjacent to the first line to generate image data for the first line while maintaining image data of other lines which are not adjacent to the first line to be added by the enlargement, and (b) enlarging a second image represented by the image data in the horizontal direction, the step of enlarging in the horizontal direction further comprising the steps of;

detecting a first pixel which is to be added by the enlargement, and interpolating a plurality of pixels of the image data adjacent to the first pixel to generate image data for the first pixel while maintaining image data of other pixels which are not adjacent to the first pixel to be added by the enlargement.

16. An image processing method according to claim 15, wherein each of the steps (a) and (b) comprises the steps of:

storing a prescribed amount of input image data in a buffer memory;

obtaining a weighted-average of first image data read from the buffer memory and second image data representing an image portion immediately following the first image data to produce third image data;

generating from an image enlargement factor a selection signal indicating an image portion which is to be added by an enlargement; and selecting in response to the selection signal and outputting one set from among a plurality of sets of image data including the input second image data and the third image data.

17. An image processing method according to claim 16, further comprising the step of:

controlling incrementing of a read address input to the frame memory responsive to the selection signal.

18. An image processing method according to claim 15, wherein each of the steps (a) and (b) uses an enlargement factor in the range of 1 to 2, whereby the image portion which is to be added by the enlargement in the step (a) is one line per location and the image portion which is to be added by the enlargement in the step (b) is one pixel per location.

19. An image processing method for enlarging an image comprising the steps of:

(a) enlarging a first image in by a first enlargement factor in the range of 1 to 2; and (b) enlarging a second image by a second enlargement factor that is an integer;

wherein the steps (a) and (b) are executed in a prescribed order to enlarge the image by a third enlargement factor equal to the product of the first and second enlargement factors.

20. An image processing method according to claim 19, wherein:

the step (a) is executed prior to step (b); and steps (a) and (b) are executed such that the step (b) produces image data at a second output rate which is equal to a product of a first output rate of the step (a) and the second enlargement factor.

21. An image processing apparatus comprising:

a frame memory for storing image data;

a vertical enlargement unit configured to enlarge a first image represented by the image data read from the frame memory in the vertical direction, to detect a first line which is to be added by the enlargement, and to interpolate a plurality of lines of the image data adjacent to the first line to generate image data for the first line; and a horizontal enlargement unit configured to enlarge a second image represented by the image data in the horizontal direction, to detect a first pixel which is to be added by the enlargement, and to interpolate a plurality of pixels of the image data adjacent to the first pixel to generate image data for the first pixel;

wherein each of the vertical enlargement unit and the horizontal enlargement unit further comprises:

a buffer memory for storing a prescribed amount of input image data;

a weighted-averaging unit configured to obtain a weighted-average of first image data read from the buffer memory and second image data representing an image portion immediately following the first image data to produce third image data; and a selector configured to select and output one set from among a plurality of sets of image data including the input second image data and the third image data output by the weighted-averaging unit;

a selection signal generator configured to generate from an image enlargement factor a selection signal indicating an image portion which is to be added by the enlargement and to supply the selection signal to the selector.

22. An image processing apparatus according to claim 21, wherein each of the vertical enlargement unit and the horizontal enlargement unit further comprises:

a read address controller responsive to the selection signal for controlling incrementing of a read address input to the frame memory.

23. An image processing method comprising the steps of:

(a) enlarging a first image represented by image data read from a frame memory in the vertical direction, the step of enlarging in the vertical direction further comprising the steps of;

detecting a first line which is to be added by the enlargement, and interpolating a plurality of lines of the image data adjacent to the first line to generate image data for the first line, and (b) enlarging a second image represented by the image data in the horizontal direction, the step of enlarging in the horizontal direction further comprising the steps of;

detecting a first pixel which is to be added by the enlargement, and interpolating a plurality of pixels of the image data adjacent to the first pixel to generate image data for the first pixel;

wherein each of the steps (a) and (b) further comprises the steps of;

storing a prescribed amount of input image data in a buffer memory, obtaining a weighted-average of first image data read from the buffer memory and second image data representing an image portion immediately following the first image data to produce third image data, generating from an image enlargement factor a selection signal indicating an image portion which is to be added by an enlargement, and selecting in response to the selection signal and outputting one set from among a plurality of sets of image data including the input second image data and the third image data.

24. An image processing method according to claim 23, wherein each of the steps (a) and (b) further comprises the step of:

controlling incrementing of a read address input to the frame memory responsive to the selection signal.

* * * * *